(12) United States Patent
Demirdjian et al.

(10) Patent No.: US 11,019,330 B2
(45) Date of Patent: May 25, 2021

(54) MULTIPLE CAMERA SYSTEM WITH AUTO RECALIBRATION

(71) Applicant: Aquifi, Inc., Palo Alto, CA (US)

(72) Inventors: David Demirdjian, Arlington, VA (US); Britta Silke Hummel, Berkeley, CA (US); Ahmed Tashrif Kamal, San Jose, CA (US); Michele Stoppa, Mountain View, CA (US); Giuliano Pasqualotto, Mountain View, CA (US); Pietro Salvagnini, Sunnyvale, CA (US)

(73) Assignee: AQUIFI, INC., Palo Alto, CA (US)

( * ) Notice: Subject to any disclaimer, the term of this patent is extended or adjusted under 35 U.S.C. 154(b) by 336 days.

(21) Appl. No.: 14/677,057

(22) Filed: Apr. 2, 2015

(65) Prior Publication Data

US 2016/0212418 A1 Jul. 21, 2016

Related U.S. Application Data

(60) Provisional application No. 62/105,008, filed on Jan. 19, 2015.

(51) Int. Cl.
*H04N 17/02* (2006.01)
*G06F 7/00* (2006.01)
*H04N 17/00* (2006.01)

(52) U.S. Cl.
CPC ............ *H04N 17/002* (2013.01); *G06F 7/00* (2013.01)

(58) Field of Classification Search
None
See application file for complete search history.

(56) References Cited

U.S. PATENT DOCUMENTS

| 8,318,094 | B1* | 11/2012 | Bayandorian | G01N 21/645 422/400 |
| 8,773,512 | B1 | 7/2014 | Rafii | |
| 2003/0218672 | A1* | 11/2003 | Zhang | H04N 7/15 348/14.16 |
| 2006/0024041 | A1 | 2/2006 | Lou et al. | |
| 2009/0315978 | A1* | 12/2009 | Wurmlin | G06T 5/005 348/43 |

(Continued)

OTHER PUBLICATIONS

Dang et al., "Continuous Stereo Self-Calibration by Camera Parameter Tracking," IEEE Transactions on Image Processing, Jun. 2, 2009, p. 1-17.*

(Continued)

*Primary Examiner* — Edemio Navas, Jr.
(74) *Attorney, Agent, or Firm* — Garlick & Markison; Timothy W. Markison; Patricia M. Healy

(57) ABSTRACT

A method for a computing device to recalibrate a multiple camera system includes collecting calibration data from one or more pictures captured by the multiple camera system of the computing device. The multiple camera system includes two or more cameras that are each physically separated by a distance from one another. The method further includes detecting decalibration of the camera system. The method further includes, when the camera system is decalibrated, generating recalibration parameters based on the calibration data. The method further includes determining whether the recalibration parameters are valid parameters and, when they are, updating the multiple camera system based on the recalibration parameters.

32 Claims, 16 Drawing Sheets

(56) References Cited

U.S. PATENT DOCUMENTS

| | | | |
|---|---|---|---|
| 2011/0157373 A1* | 6/2011 | Ye | G06T 7/85 |
| | | | 348/187 |
| 2013/0114043 A1* | 5/2013 | Balan | H04N 13/044 |
| | | | 351/210 |
| 2013/0208009 A1* | 8/2013 | Moden | G06T 5/006 |
| | | | 345/644 |
| 2013/0321589 A1 | 12/2013 | Kirk et al. | |
| 2014/0098229 A1 | 4/2014 | Lu et al. | |
| 2016/0335755 A1* | 11/2016 | Hilsebecher | G06T 7/002 |

OTHER PUBLICATIONS

International Searching Authority; International Search Report and Written Opinion; dated Apr. 1, 2016; pp. 1-22.

Dang, et al.; Continuous stereo self-calibration by camera parameter tracking; IEEE Transactions on Image Processing; Jun. 2, 2009; pp. 1-17 [Retrieved from <http://www.mrt.kit.edulz/publ/download/dangStillerHoffmannTIP09.pdf>].

Rastgar; Robust Self-Calibration and Fundamental Matrix Estimation in 3D Computer Vision; In: Diss. University of Ottawa; 2013; pp. 4, 12, 13, 25-32, 34, 36, 38, 39, 41, 49, 52, 61-63, 72, 79, 90, 94, 131 Retrieved from <http://www.ruor.uottawa.ca/bitstream/10393/26199/1/Rastgar_Houman_2013_thesis.pdf>.

* cited by examiner

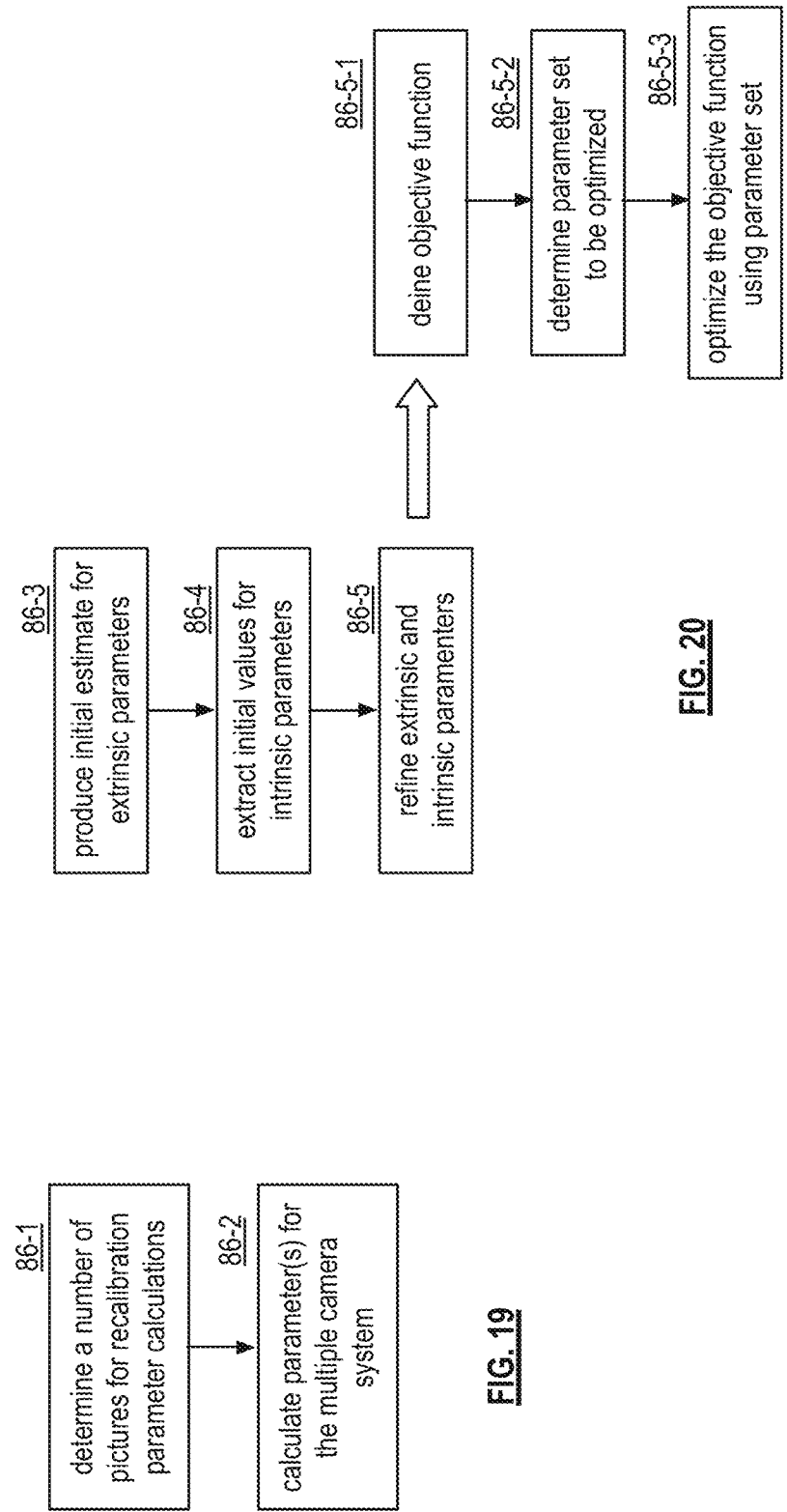

MULTIPLE CAMERA SYSTEM WITH AUTO RECALIBRATION

CROSS REFERENCE TO RELATED PATENTS

The present U.S. Utility patent application claims priority pursuant to 35 U.S.C. § 119(e) to U.S. Provisional Application No. 62/105,008, entitled "MULTIPLE CAMERA SYSTEM WITH AUTO RECALIBRATION", filed Jan. 19, 2015, which is hereby incorporated herein by reference in its entirety and made part of the present U.S. Utility patent application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates generally to image processing and more particularly to auto recalibration of a multiple camera system.

Description of Related Art

Many devices incorporate a multiple camera system to infer three-dimensional information of an object, or objects, in an image. There are a variety of techniques for determining the three-dimensional information of an object in an image including stereovision (disparity between images from multiple cameras), laser triangulation, time of flight, and projected light. A device may use the three-dimensional (3D) information in a variety of ways. For example, the 3D information may be used to for gesture recognition, gaming functions, editing an object within a picture, etc.

For accurate 3D information to be derived from pictures taken by a multiple camera system, external parameters of the cameras and internal parameters of the cameras need to be well defined. The external parameters (or extrinsic parameters) relate to a camera's orientation and its position to the object coordinate frame. The camera's orientation may be mathematically expressed using a rotation matrix and the camera's position to the object coordinate frame may be mathematically expressed using a translation vector. The internal parameters (or intrinsic parameters) determine the projection from the camera coordinate frame onto image coordinates and includes focal length, image principal point, and potentially distortion parameters.

With the intrinsic and extrinsic parameters accurately defined, accurate 3D information can be computed from pictures. For a device with a multiple camera system, the intrinsic and extrinsic parameters are accurately determined at the time of manufacture. Over time, due to dropping of the device, exposure to temperature changes, and/or aging of the materials of the multiple camera system, the intrinsic parameters and/or the extrinsic parameters drift. When the drift is significant, the intrinsic parameters and/or extrinsic parameters are out of calibration and, as such, the 3D information can no longer be accurately calculated from a picture.

BRIEF DESCRIPTION OF THE SEVERAL VIEWS OF THE DRAWING(S)

FIG. 19 is a logic diagram of an embodiment of a method for generating recalibration parameters in accordance with the present invention; and FIG. 20 is a logic diagram of an embodiment of a method for generating parameters per step 86-2 of FIG. 19.

DETAILED DESCRIPTION OF THE INVENTION

Figure 1:
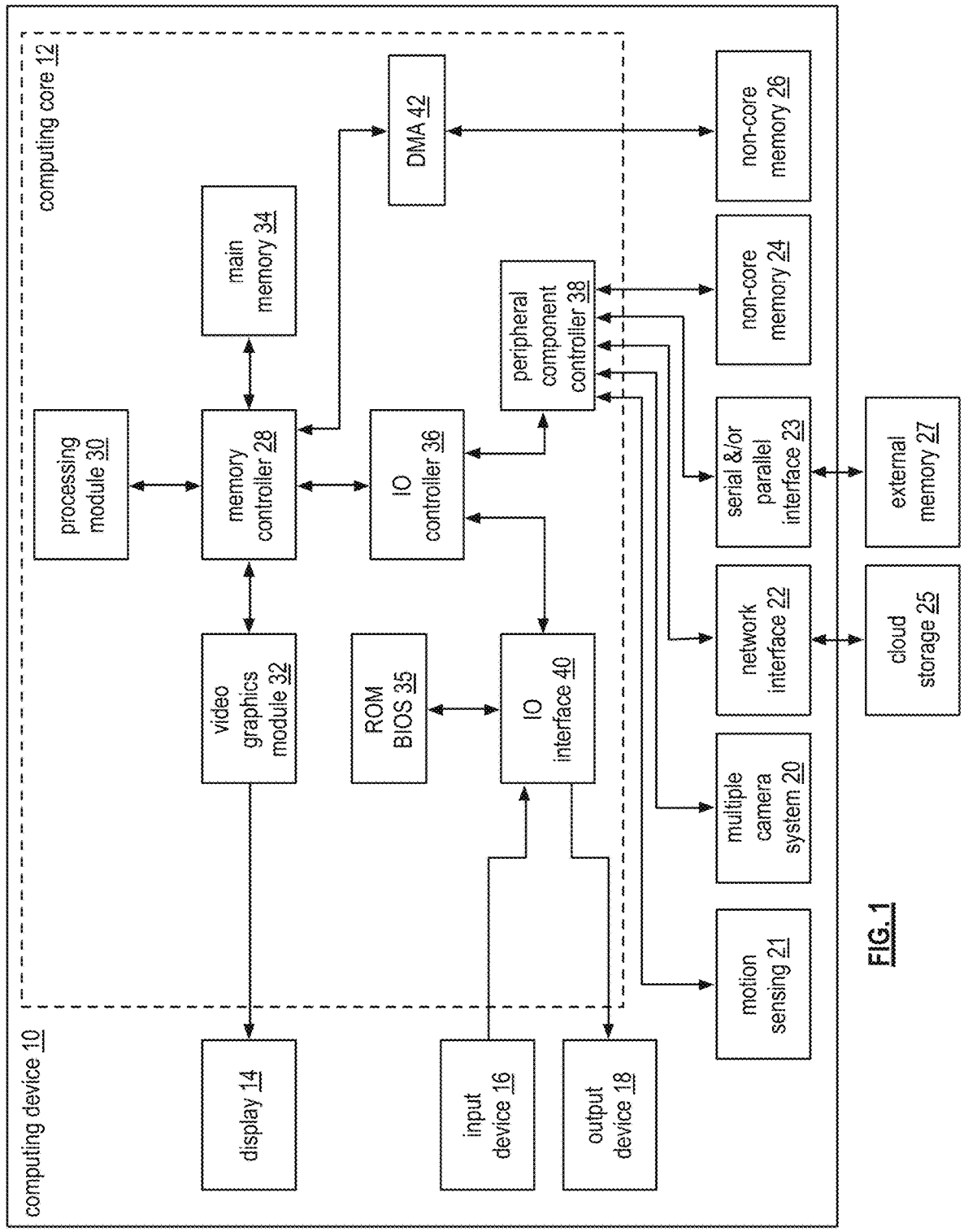
FIG. 1 is a schematic block diagram of an embodiment of a computing device in accordance with the present invention.

FIG. 1 is a schematic block diagram of an embodiment of a computing device 10 that includes a computer core 12, a display 14, one or more input devices 16, one or more output devices 18, a multiple camera system 20, motion sensing circuitry 21 (e.g., accelerometer, gyroscope, etc.), a network interface 22, a serial and/or parallel interface 23, and/or non-core memory 24-26 (e.g., a hard drive, solid-state memory, or other type of memory device). The computing core 12 includes a memory controller 28, one or more processing modules 30, a video graphics processing module 32, main memory 34 (e.g., random access memory (RAM)), a read only memory (ROM) basic input output system (BIOS), an input/output (IO) controller 36, a peripheral component controller 38, an 10 interface 40, and/or a direct memory access (DMA) module 42. The computing device may be a cellular telephone, a tablet computer, a laptop computer, a video game unit, a digital camera, a surveillance system, a tracking system, etc. Note that the display 14 may be a touch screen such that the input device(s) 16 is integrated into the display.

The network interface 22 includes one or more of a wireless local area network (WLAN) network adaptor, a wireless wide area network (WWAN) network adapter, a LAN network adapter, and a WAN network adapter. The network interface 22 supports a variety of communication protocols including, but not limited to, various version of Ethernet, LTE (long term evolution), and IEEE802.11 to enable to the computing device to access cloud storage 25 and other Internet services.

The serial and/or parallel interface 23 includes one or more of a USB (universal serial bus), IEEE 1394, I2C interface, SPI (serial-parallel interface), etc. The serial and/or parallel interface 23 allows the computing device to be coupled to a variety of other devices, including an external memory 27 such as a hard drive.

The computing device 10 stores in its memory (main memory 34, non-core memory 24, 26, external memory 27, and/or cloud storage 25) user algorithms and system algorithms. The user algorithms include, but are not limited to, video games, web browsers, word processing, spreadsheet processing, instant messaging, texting, email, image capturing, video capturing, image editing, video edit, etc. The system algorithms include an operating system, the BIOS, etc. The system algorithms further include a multiple camera system automatic recalibration algorithm as will be described in one or more the subsequent figures.

Figure 2:
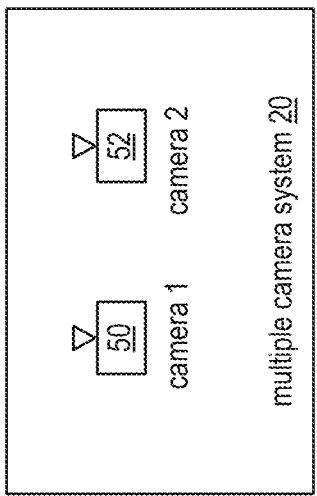
FIG. 2 is a schematic block diagram of an embodiment of a multiple camera system in accordance with the present invention.

FIG. 2 is a schematic block diagram of an embodiment of a multiple camera system 20 that includes two cameras 50 and 52. The cameras are typically mounted on a printed circuit board (or the like) and arranged to provide a relative three dimensional pose (e.g., spaced at a predetermined distance (e.g., norm of the translation vector), establishing the translation vector, the rotation (e.g., three angles, one per axis), etc.). The cameras may be positioned to be parallel, to be non-parallel, to lie in approximately the same image plane, or to lie in different image planes. The manufacturer makes these decisions in accordance with its desired specifications of the multiple camera system. During the manufacturing the multiple camera system, an offline calibration scheme is employed to calibrate it. The multiple camera system is positioned along an outer surface of the device for an unobstructed viewing angle for capturing photographs and/or video. Hereinafter, a picture will be used to refer to a single photograph or a frame of video.

Figure 3:
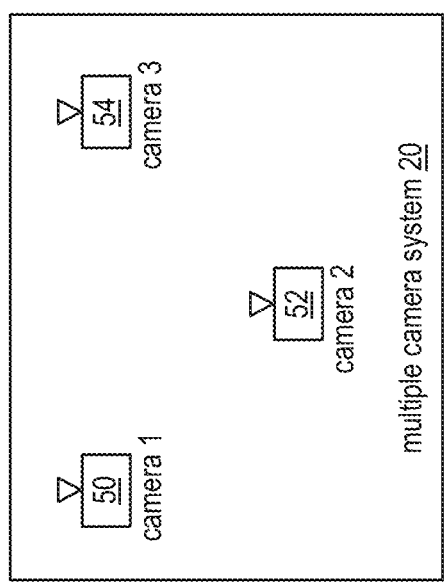
FIG. 3 is a schematic block diagram of another embodiment of a multiple camera system in accordance with the present invention.

FIG. 3 is a schematic block diagram of another embodiment of a multiple camera system 20 that includes first, second, and third cameras 50, 52, and 54. Each camera pair (e.g., the first and second cameras, the first and third cameras, and the second and third cameras) are spaced at a predetermined distance. Note that a multiple camera system 20 may have more than three cameras, where each camera pair has a corresponding predetermined distance between them.

Figure 4:
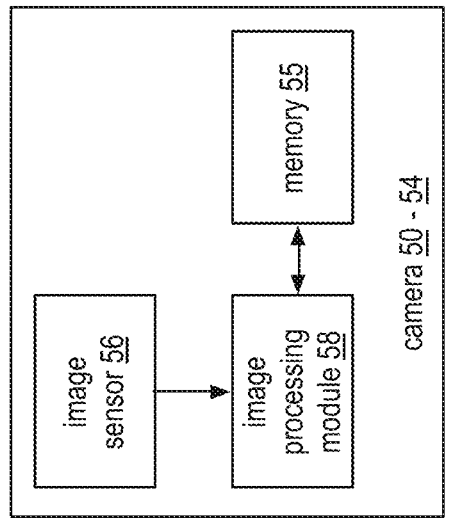
FIG. 4 is a schematic block diagram of an embodiment of a camera in accordance with the present invention.

FIG. 4 is a schematic block diagram of an embodiment of a camera 50-54 that includes an image sensor 56 (e.g., a charge coupled device (CCD) or a complimentary metal oxide semiconductor (CMOS) device) and an image processing module 58. The camera may further include memory 55 (e.g., RAM, flash memory, etc.). The camera may still further include a lens positioned over the image sensor 56.

The image processing module 58 is a processing module that performs one or more image processing functions. For example, the image processing functions include one or more of filtering (e.g., a Bayer filter mosaic and/or anti-aliasing), demosaicing to create a full array of RGB image data from color information, JPEG processing, MPEG processing, etc. The image processing module 58 may further perform a 3D analysis function to determine depth information for objects within a picture. Alternatively, or in combination, the processing module 30 of the device may perform the 3D analysis function.

Figure 5:
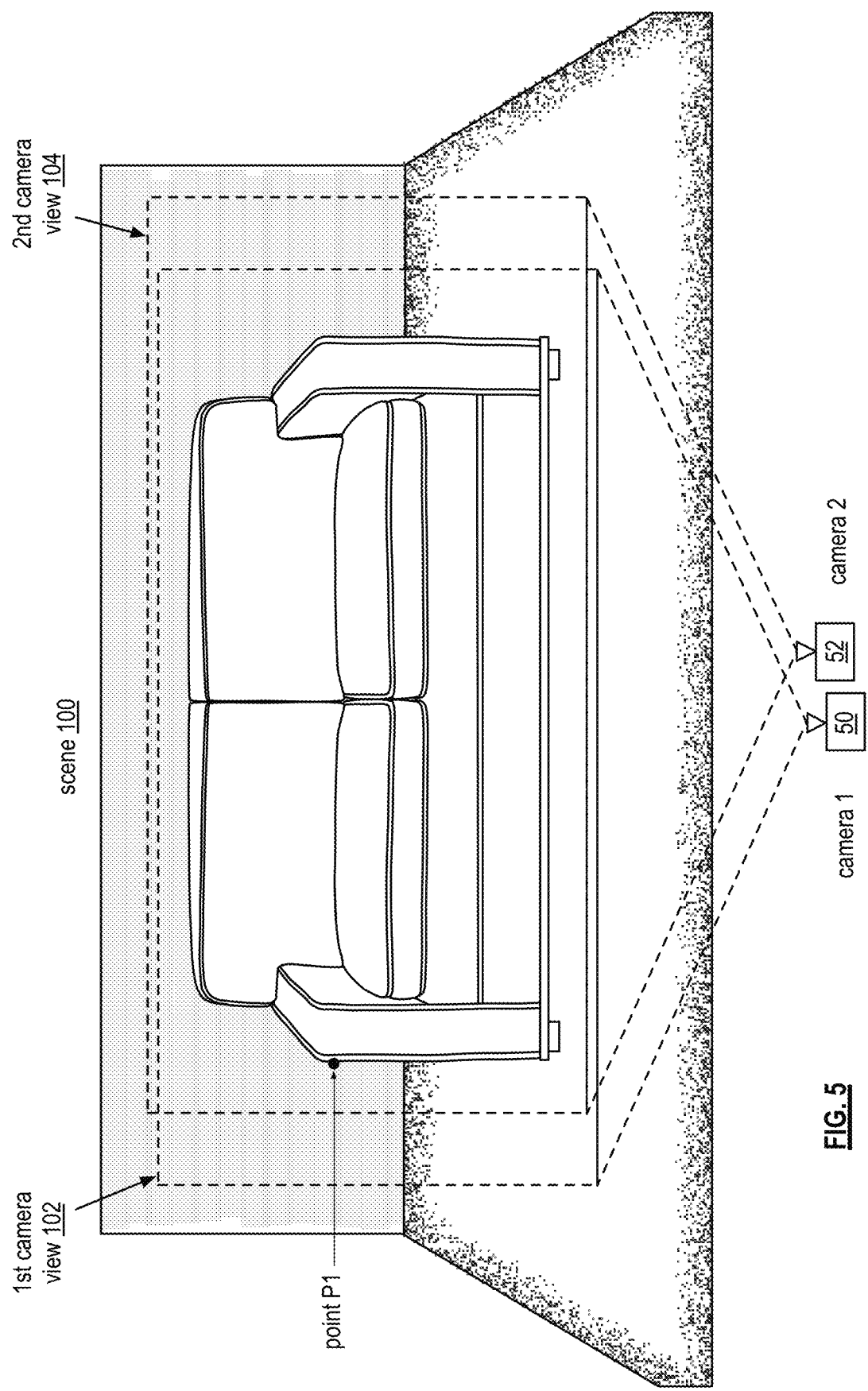
FIG. 5 is a front view diagram of an example of a scene for which the multiple camera system will take a picture.

FIG. 5 is a front view diagram of an example of a scene 100 for which the multiple camera system will take a picture. In this example, the multiple camera system is taking a picture of a couch that is positioned up against a wall and sitting on a floor. Each of the cameras of the multiple camera system (e.g., the first 50 and second 52 cameras) has a slightly different viewing angle 102 and 104 of the couch. As such, the picture or image data captured by the cameras will be slightly different. As a reference, the example includes a matching point of interest P1 (a common point of the picture as seen by both cameras).

Figure 6:
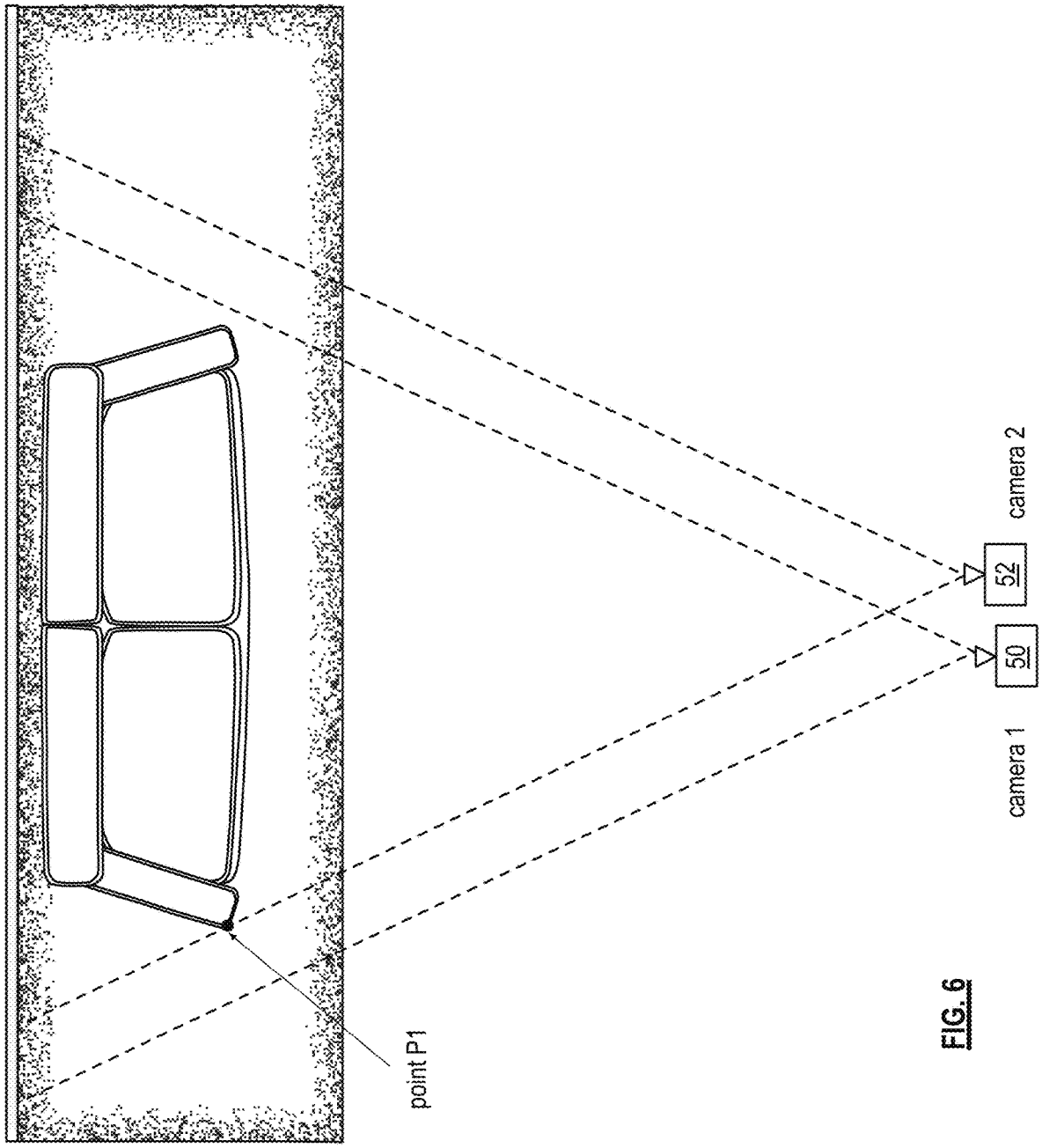
FIG. 6 is an overhead view diagram of the example of a scene for which the multiple camera system will take a picture.

FIG. 6 is an overhead view diagram of the example of a scene 100 for which the multiple camera system will take a picture. In this view, the cameras 50 and 52 also have a slightly different viewing angle of the couch. The slightly different views coupled with the known distance between the cameras and accurate calibration settings allow for depth information to be accurately calculated.

Figure 7:
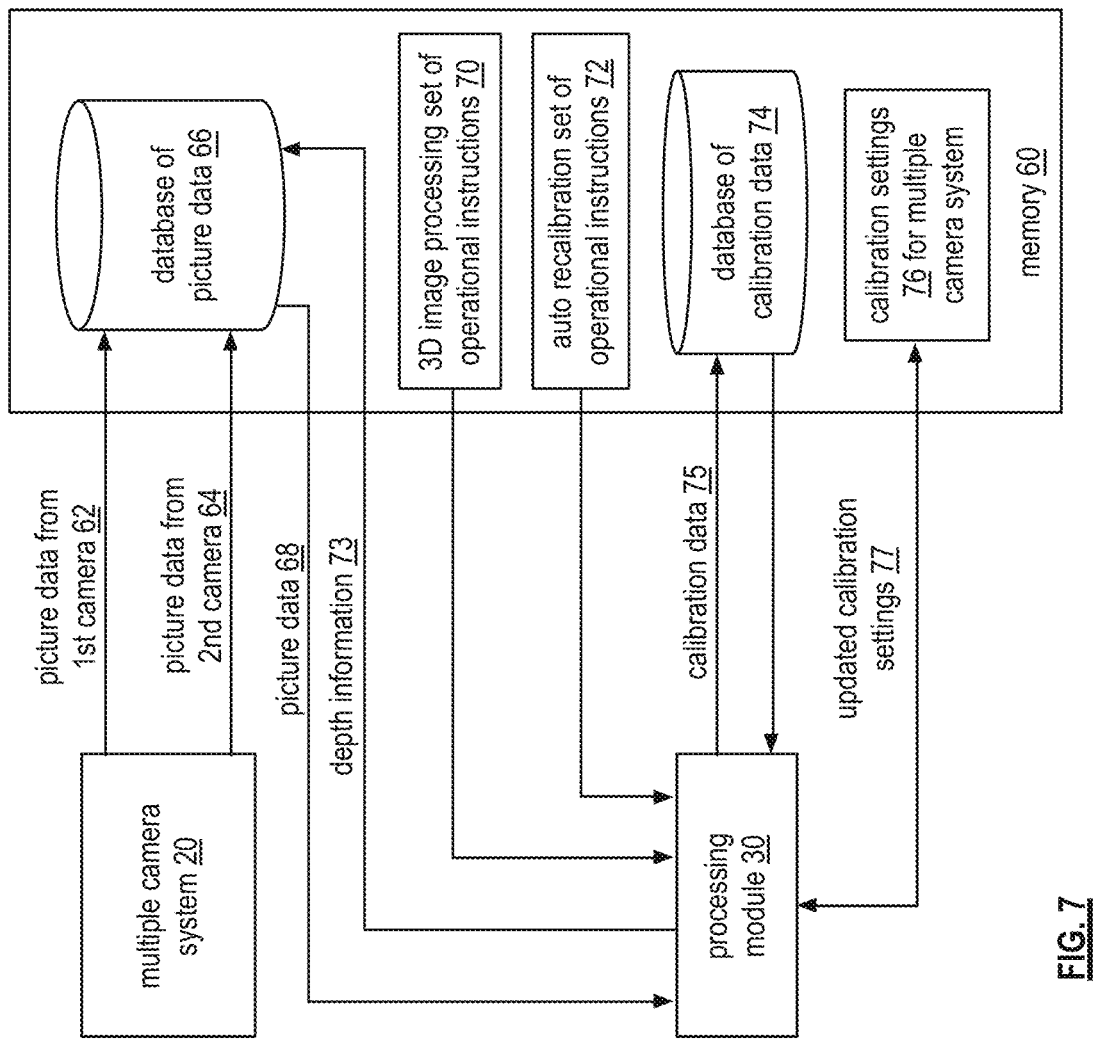
FIG. 7 is a functional block diagram of an example of the computing device processing image data of pictures in accordance with the present invention.

FIG. 7 is a functional block diagram of an example of the computing device 10 processing image data of pictures (e.g., photographs and/or frames of video) and performing an automatic recalibration of the multiple camera system. In this example, the multiple camera system 20 takes a variety of pictures. For each picture, the multiple camera system 20 generates picture data 62 and 64 from each of the cameras in the system 20 (in this example, there are two cameras). The picture data 62 and 64 includes RGB (red, green, blue) data, RGGB (red, green, green, blue) data, RGBIR (red, green, blue, infrared) data, grayscale data, or other color information format for an array of pixels. Depending on a camera's capture resolution, there may be 0.3 Mega-pixels per picture data up to, or in excess, of 10 Mega-pixel per picture data.

The first and second picture data 62 and 64 for a picture is stored in a database 66 of picture data, which is in the computing device's memory 60. Memory 60 includes one or more of the main memory 34, the non-core memories 24 and 26, the external memory 27, and the cloud storage 25.

To perform three-dimensional (3D) image processing of one or more pictures, the computing device's processing module 30 retrieves picture data 68 of one or more pictures, retrieves the calibration settings 76 for the multiple camera system (e.g., extrinsic parameters and/or intrinsic parameters), and retrieves a 3D image processing set of operational instructions 70 from memory 60. The processing module 30 executes the 3D image processing set of operational instructions 70 on the picture data 68 (e.g., picture data 62 and/or 64 from the first and/or second cameras), in accordance with the calibration settings 76, to generate depth information 73, which is subsequently stored in the database 66. The generation of the depth information may be dense (e.g., a majority of the pixels have depth information calculated for them) or it may be sparse (e.g., a minority of the pixels have depth information calculated for them). The 3D image processing set of operational instructions 70 correspond to one of a variety of existing programs that calculate depth information from pictures (e.g., stereovision, laser triangulation, time of flight, projected light, etc.) or a new program to calculate depth information.

As part of an automatic recalibration process, the processing module 30 retrieves an auto recalibration set of operational instructions 72 from memory 60. As a first part of executing the auto recalibration set of operational instructions 72, the processing module 30 retrieves picture data 68 for a picture from the database 66. The processing module 30 then generates calibration data 75 from the retrieved picture data 68 for the picture and stores it in a database 74 of calibration data within memory 60.

The processing module 30 continues to execute the auto recalibration set of operational instructions 72 to determine whether the multiple camera system is decalibrated (e.g., an indication that the multiple camera system is out of calibration resulting in inaccurate depth information). When the multiple camera system is decalibrated (e.g., detection of decalibration in one or more pictures; for instance, three pictures), the processing module continues to execute the auto recalibration set of operational instructions 72 to retrieve calibration data 75 for a plurality of pictures from database 74. The processing module continues to execute the auto recalibration set of operational instructions 72 to generate updated calibration settings 77 (e.g., one or more recalibrated extrinsic parameters and/or one or more recalibrated intrinsic parameters) based on the retrieved calibration data 75. When the updated calibration settings 77 are valid, the processing module 30 writes them to memory 60, which are stored as the calibration settings 76 for the multiple camera system and are subsequently used to generate depth information 73. Alternatively, or in addition, the calibration settings 76 may be stored in memory of the multiple camera system. Note that the calibration settings (e.g., one or more extrinsic parameters and/or one or more intrinsic parameters) that were not updated (e.g., they were still in calibration) remain stored in memory for future use with the updated calibration settings.

Figure 8:
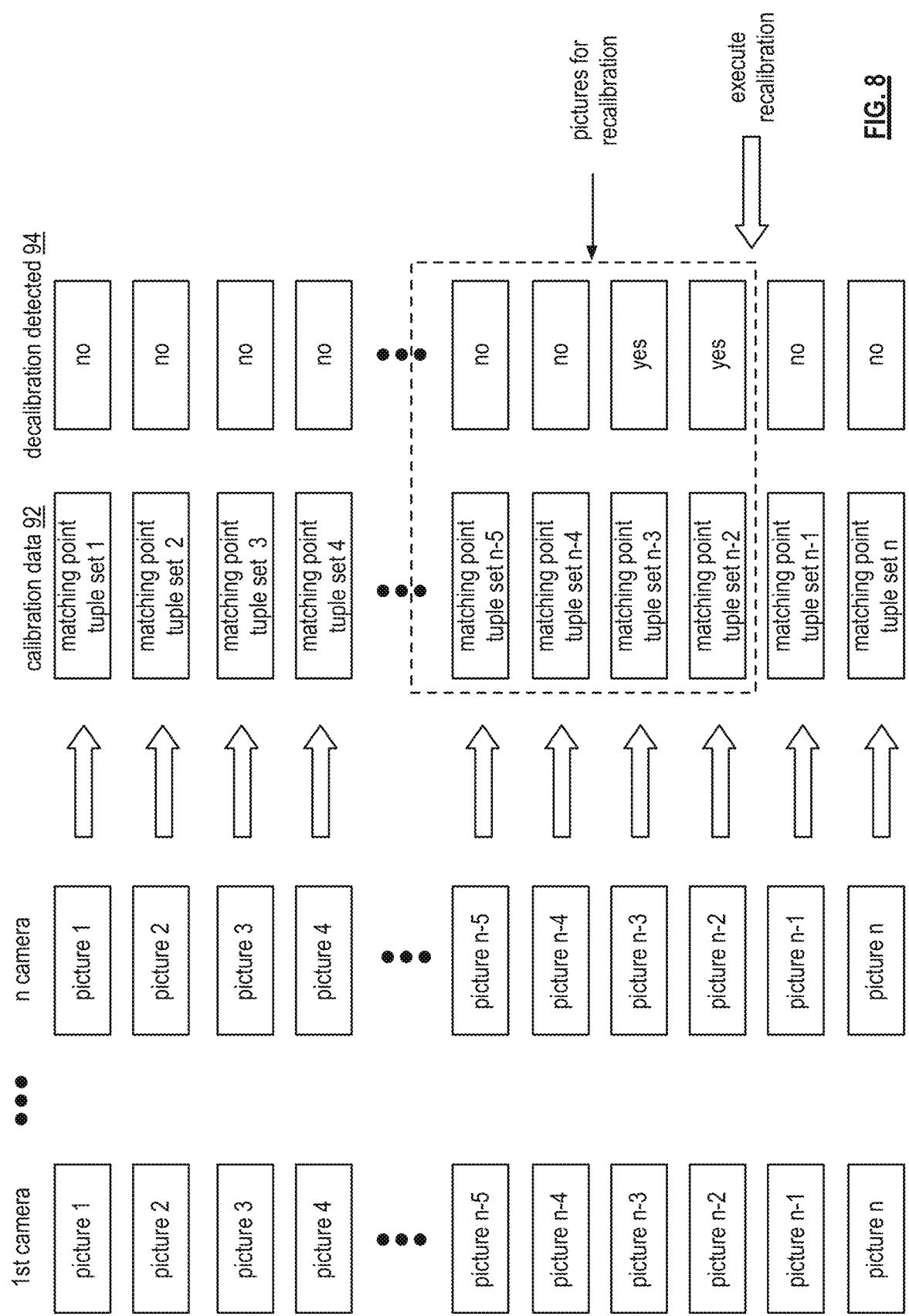
FIG. 8 is a functional block diagram of an example of the computing device processing image data of pictures in accordance with the present invention.

FIG. 8 is a functional block diagram of an example of the computing device 10 taking a series of pictures (e.g., 1-n) using a multiple camera system 20 that includes a plurality of cameras (e.g., a first camera through an $n^{th}$ camera). From each picture (e.g., picture data or image data from each of the cameras), the processing module 30 generates calibration data 92. For a picture, the calibration data includes a set of matching point tuples (e.g., a point tuple is the point data (e.g., fraction of a pixel, a pixel, or multiple pixels) from each of the cameras regarding a common point in the image), a pair of points for each camera pair, the entire image, a portion of the image, and/or other image data of the multiple camera system to detect decalibration. The processing module then determines whether decalibration is detected 94.

In this example, decalibration 94 is first detected with picture n-3. Depending on the level of certainty of decalibration, the recalibration process may be initiated after detecting decalibration of picture n-3. In some situations, decalibration of multiple pictures is detected before the recalibration process is initiated (e.g., two or more pictures). When decalibration is detected, the processing module generates one or more recalibration parameters based on the calibration data from a set of pictures (e.g., two or more pictures). When the recalibration parameters are valid, the processing module 30 updates the calibration settings of the multiple camera system with the one or more recalibration parameters. Note that the processing module may perform the recalibration process on multiple pictures (e.g., up to fifteen or more) before the one or more recalibration parameters converge.

Figure 9:
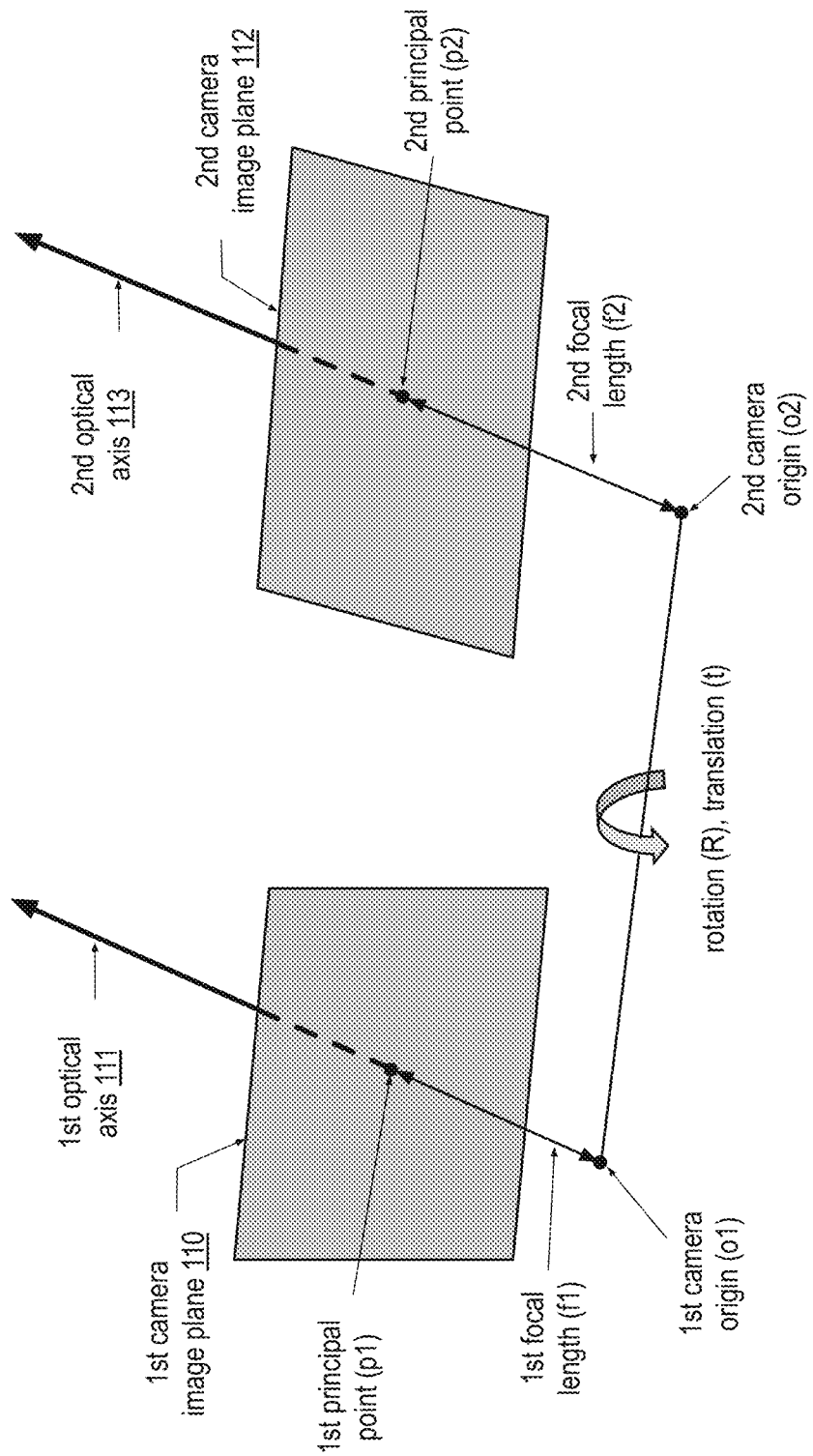
FIG. 9 is a diagram of an example of a setup of a multiple camera system.

FIG. 9 is a diagram of an example setup of a multiple camera system that includes first and second cameras. The first camera has a first image plane 110, a first principal point (p1), a first focal length (f1), a first optical center (o1), and a first optical axis 111. The second camera has a second image plane 112, a second principal point (p2), a second focal length (f2), a second optical center (o2), and a second optical axis 113. The first and second optical centers o1 and o2 are spaced at a predetermined distance and the first and second image planes 110 and 112 have a rotation (R) and a translation (t) between them in one or more of a three-axis coordinate system.

Within a multiple camera system, the focal lengths and resolution of each camera may be different. In this example, camera 2 has a longer focal length than camera 1. In addition, each camera may include a multiple lens system that can individually add distortion to a picture. Since this example is based on a pinhole camera model, lens distortion is not illustrated, but it too can be compensated for in the recalibration process described herein.

To initially calibrate this two-camera system, knowledge is required for the focal length of each camera, the principal point of each camera, the rotation and translation of camera two with respect to camera one, and lens distortion of the cameras. The same information is needed for a multiple camera system that includes more than two cameras. Calibration and recalibration are further discussed with reference to FIGS. 10-14.

Figure 10:
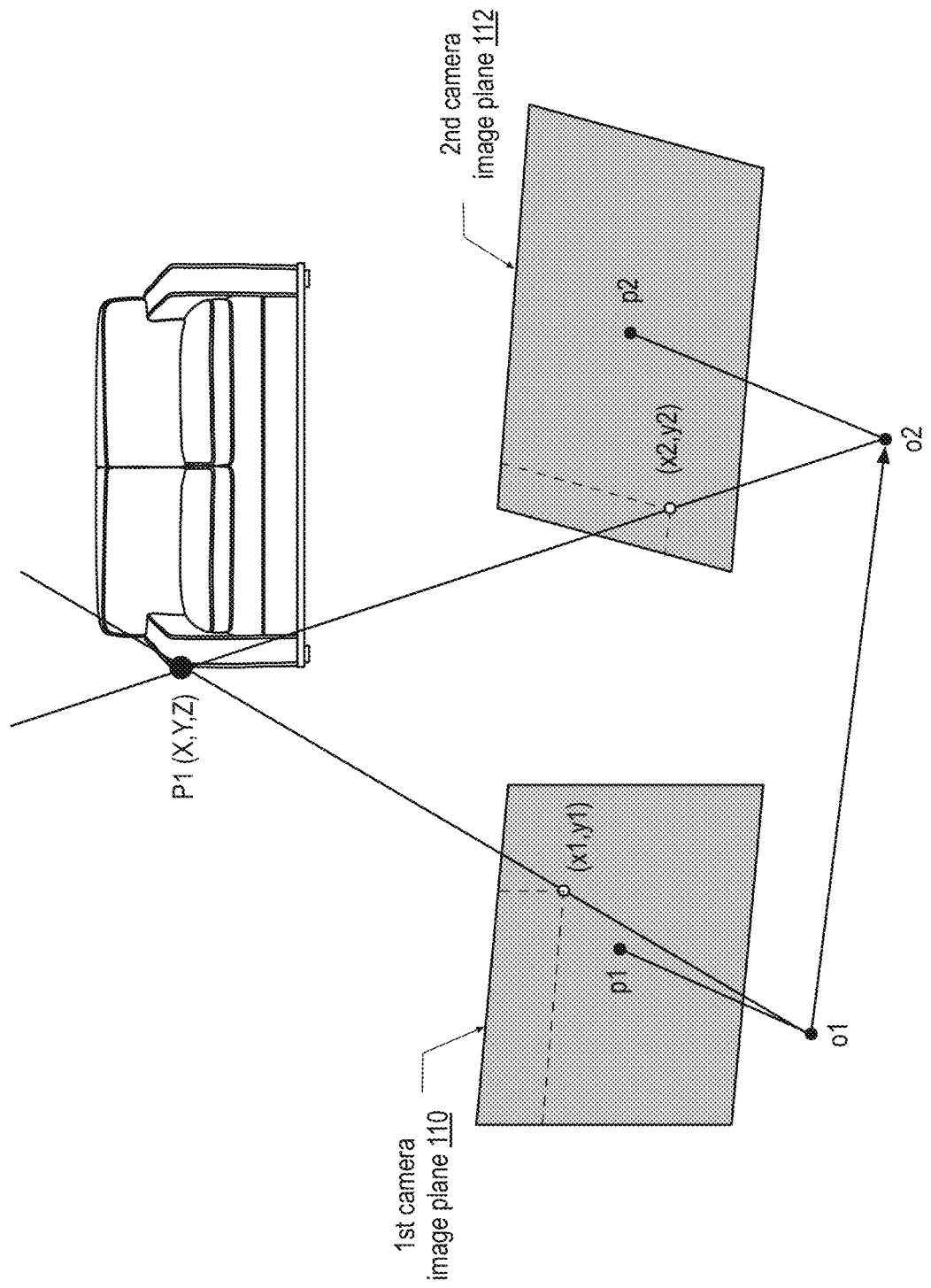
FIG. 10 is a diagram of an example of a calibrated multiple camera system.

FIG. 10 is a diagram of an example of a calibrated multiple camera system that includes two cameras. In this example, the multiple camera system is taking a picture of a couch. For a given pixel of the image, its distance to the camera is provided. For instance, point P1 on the couch has real world coordinates of (x,Y,Z), which is captured by the first camera at (x1,y1) on its image plane and by the second camera at (x2,y2) on its image plane.

When the camera system is in calibration, the values of (X,Y,Z) can be deduced from the pixel locations (x1,y1) and (x2,y2). Graphically, a line is extended from the first optical center (o1) through the first image pixel (x1,y1) and a second line is extended from the second optical center (o2) through the second image pixel. The intersection of the two lines occurs at the point (X,Y,Z). The values for (X,Y,Z) can be readily calculated based on the intersection of the two lines. When this is done for each pixel of the image (or at least some of the pixels), three-dimension data is obtained for the image.

Figure 11:
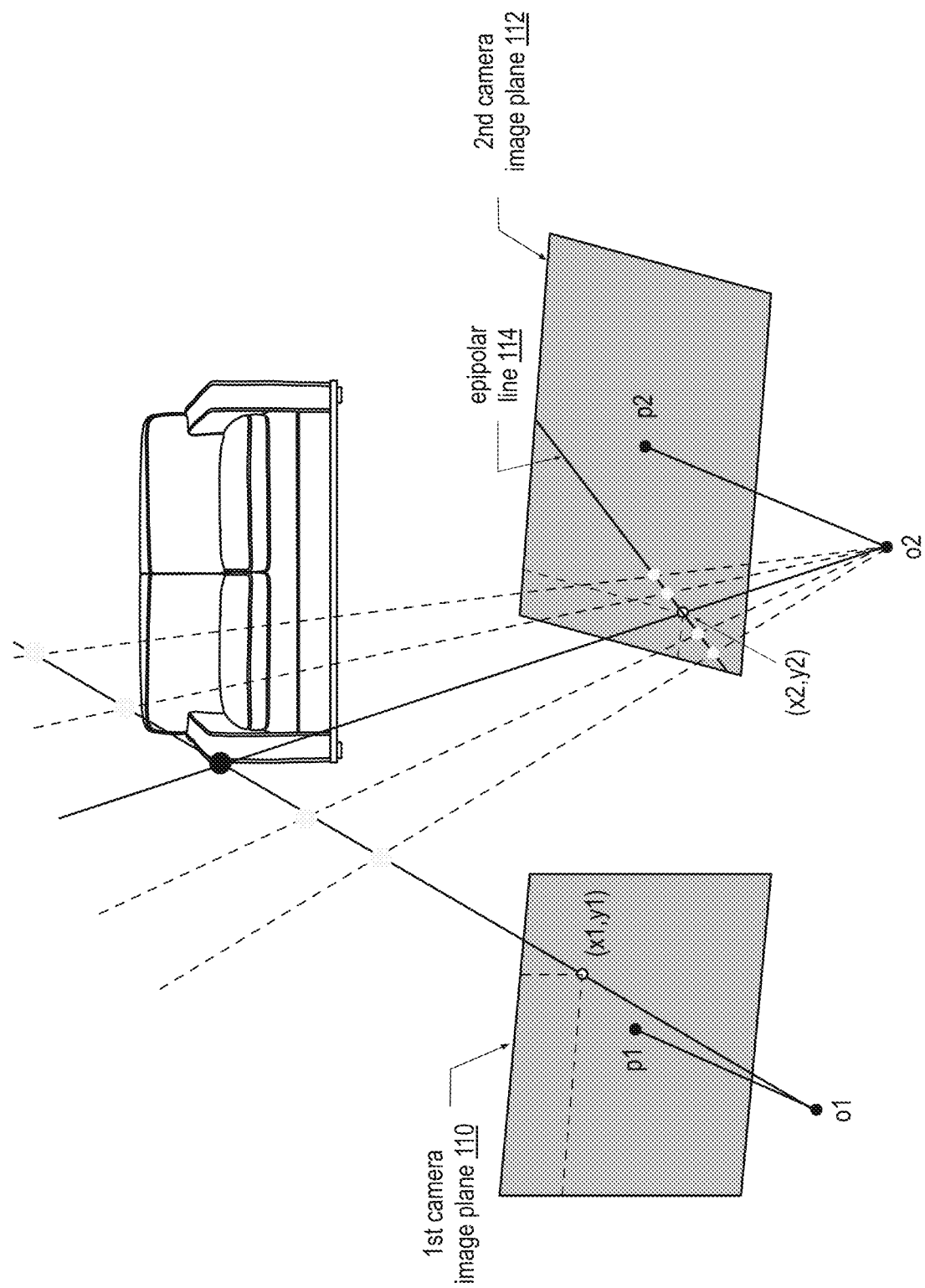
FIG. 11 is an example of checking for decalibration when the multiple camera system is in calibration.

FIG. 11 is an example of checking for decalibration when the multiple camera system is in calibration. In this example, the camera system has previously estimated a point correspondence between the first and second image pixels (x1,y1) and (x2,y2). Given the first image pixel position (x1,y1), any scene point along the line from the first optical center through the first image pixel could give rise to a corresponding pixel location in the second image plane 112. When the line from the first optical center through the first image pixel is projected on to the second image plane 112, it yields an epipolar line 114 for the first image pixel (x1,y1). When the camera system is in calibration, the corresponding second image pixel (x2,y2) will lie on the epipolar line 114.

Figure 12:
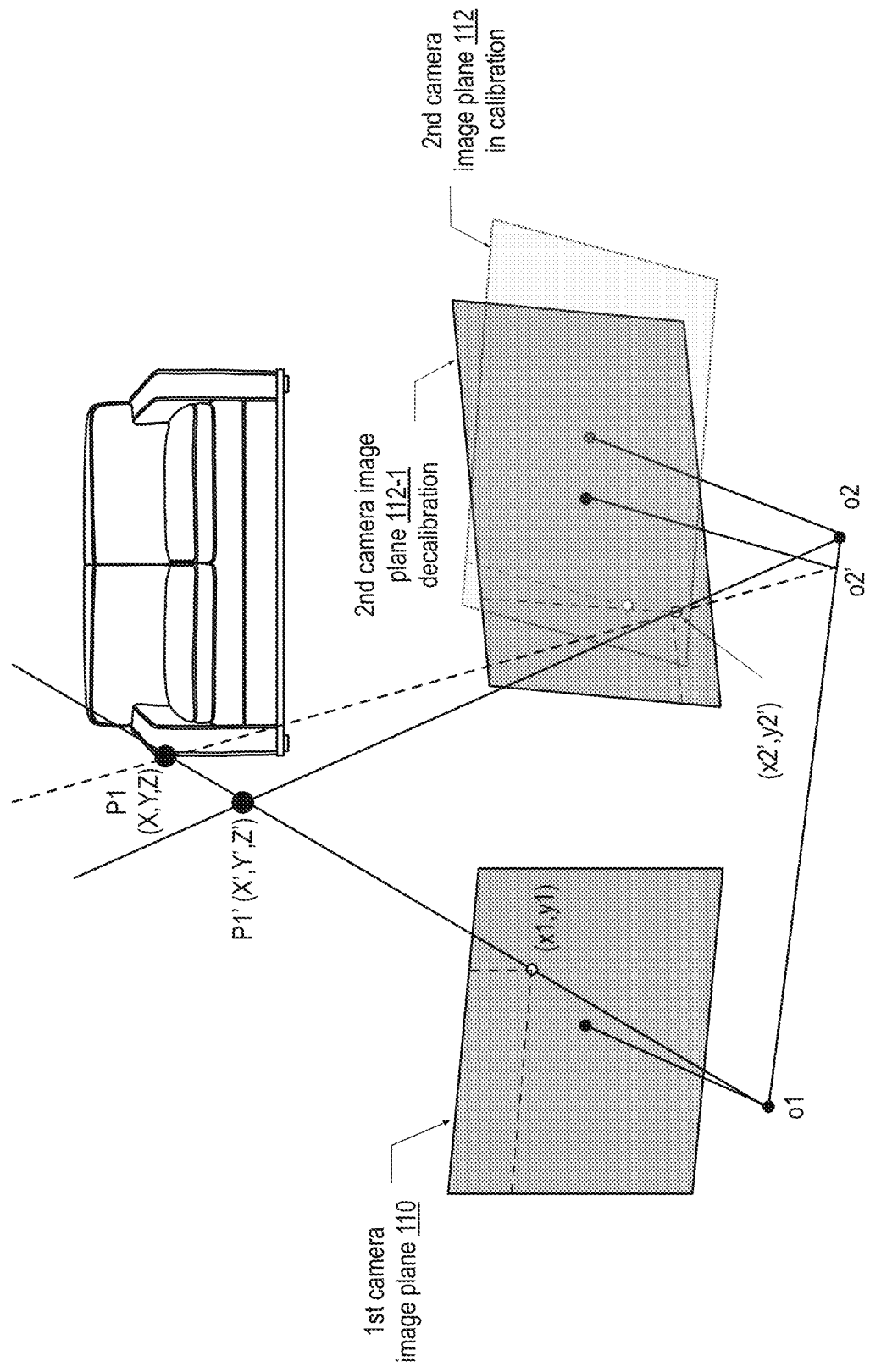
FIG. 12 is an example of a multiple camera system that is decalibrated.

FIG. 12 is an example of a multiple camera system that is decalibrated. When the multiple camera system is decalibrated, three-dimensional reconstruction becomes erroneous. In this example, camera 2 undergoes an unknown translation and rotation from its original location o2 to a new location o2'. The scene point is now imaged at a different pixel (x2',y2'). If movement of the camera is unknown, then the old location o2 together with the new pixel location (x2',y2') will be used to define the second line. This yields a new three-dimensional position at (X',Y',Z'), which is incorrect. As such, the camera parameters need to be known at all times to perform accurate three-dimensional reconstruction.

Figure 13:
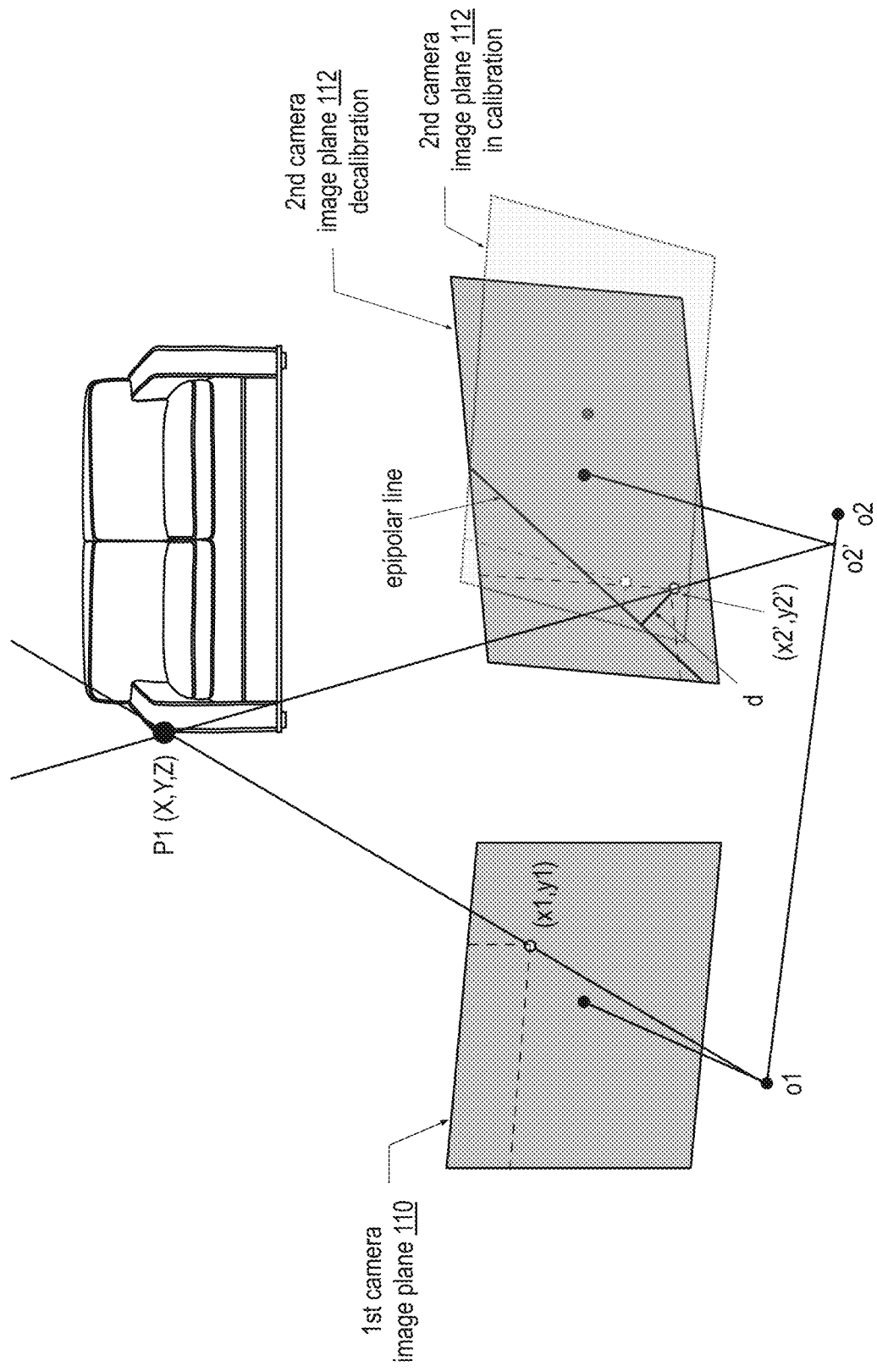
FIG. 13 is an example of checking for decalibration when the multiple camera system is out of calibration.

FIG. 13 is an example of checking for decalibration when the multiple camera system is out of calibration. In this example, the epipolar line for (x1,y1) remains at the same pixel locations in camera two from FIG. 11, since it is determined when the multiple camera system was in calibration. However, the imaged scene pixel will assume a new position (x2',y2'). As shown, the new position for the second pixel image is not on the epipolar line 114. As such, it is known that the multiple camera system is out of calibration. The distance d from the new position to the epipolar line can be used as a measure of decalibration.

Figure 14:
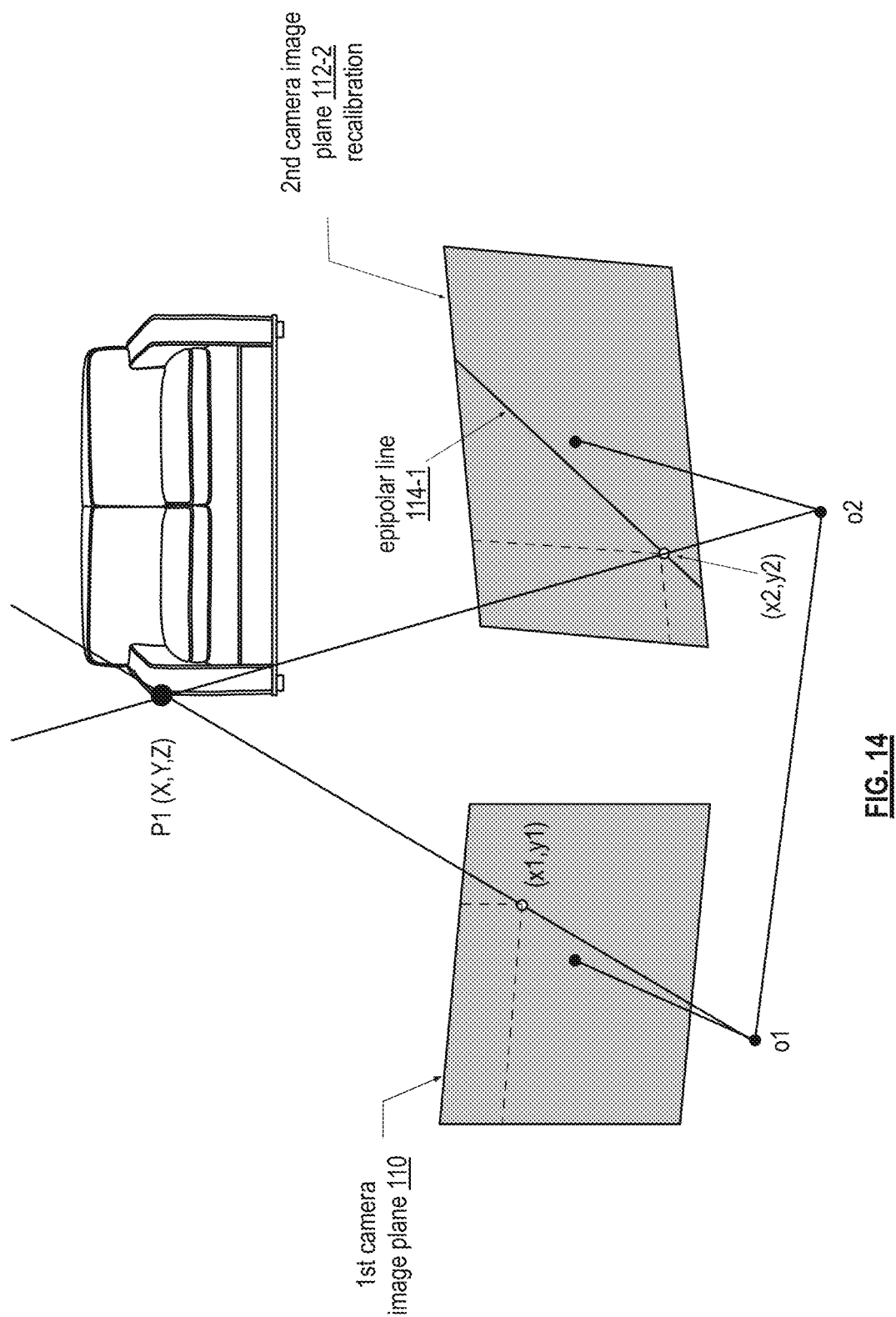
FIG. 14 is an example of a multiple camera system that is recalibrated.

FIG. 14 is an example of a multiple camera system that is recalibrated. This example is a continuation of the example of FIG. 13 when it is detected that the multiple camera system is out of calibration. When this occurs, the multiple camera system initiates the recalibration process to produce one or more recalibrated parameters (e.g., one or more intrinsic parameters and/or one or more extrinsic parameters). Once the parameters that were out of calibration have been recalibrated, the multiple camera system can again produce accurate three-dimensional reconstructions.

Figures 15, 16:
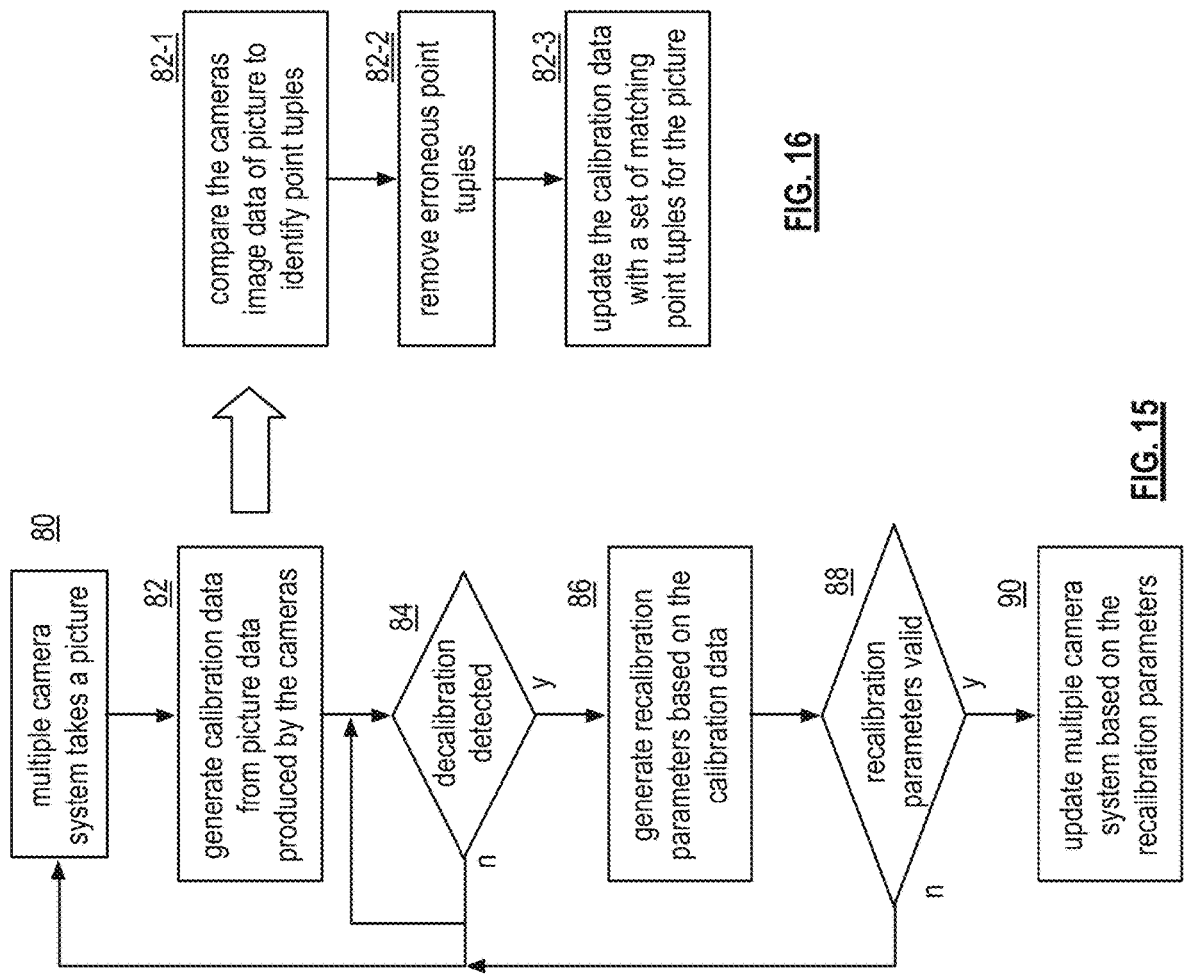
FIG. 15 is a logic diagram of an embodiment of a method for automatic recalibration of a multiple camera system within a computing device in accordance with the present invention.
FIG. 16 is a logic diagram of an embodiment of a method for generating calibration data in accordance with the present invention.

FIG. 15 is a logic diagram of an embodiment of a method for automatic recalibration of a multiple camera system within a computing device. This method, and one or more of the subsequent figures, provides a logical description of an embodiment of the auto recalibration set of operational instructions 72 of FIG. 7.

The method starts at step 80 where the computing device 10 uses the multiple camera system 20 to take a picture (e.g., a photograph or a frame of video). The method continues at step 82 where the processing module 30 generates calibration data from one or more pictures captured by the multiple camera system 20. For example, each time the computing device takes a picture; the processing module generates calibration data for that picture. One or more examples of generating the calibration data will be described with reference to one or more of FIGS. 8-14.

The method continues at step 84 where the processing module 30 determines whether the multiple camera system is out of calibration (i.e., decalibration detected). This can be done in a variety of ways. For example, the processing module 30 detects a set of matching point tuples across all cameras and checks whether the relative pixel locations between the pixels in the tuple are in accordance with the present calibration parameters. The processing module does this by checking the distance to the epipolar lines corresponding to the tuple's pixels, where the epipolar lines depend on the calibration parameters. As such, if a tuple's pixels do not fall on its epipolar lines or is not within an acceptable distance from the epipolar line, the processing module indicates decalibration (or a wrong match).

As another example, the processing module 30 detects an occurrence of a physical event (e.g., dropping, rapid acceleration, rapid deceleration, flexing, a temperature increase, a temperature decrease, a use milestone, selection by a user of the device, auto-detection by the processing module, and/or an aging milestone). For instance, the motion sensing circuitry 21 of the computing device may be used to detect dropping, a collision, rapid acceleration, and/or rapid deceleration. Temperature changes may be captured via a thermometer embedded in the computing device 10. Use and aging milestones (e.g., hours the devices is used and age of the computing device, respectively) can be readily determined from a counter and/or a clock of the computing device.

When decalibration is detected, the method continues at step 86 where the processing module 30 generates one or more recalibration parameters based on the calibration data. This may be done in a variety of ways. For example, the processing module 30 obtains (e.g., calculates, looks up, retrieves, etc.) camera parameter constraints regarding the cameras of the multiple camera system 20. For instance, the camera parameter constraints include one or more of a probabilistic distribution of camera parameter values, which could be learned offline (e.g., focal length f=900±12) and flags (probabilities) indicating which cameras are uncalibrated. These could be estimated during the calibration/rectification verification phase. Next, the processing module 30 calculates (as will be discussed in greater detail with reference to FIG. 18) one or more intrinsic parameters and/or one or more extrinsic parameters for each camera of the two or more cameras using one or more function, the camera parameter constraints, and the calibration data. Note that calibration data that was not updated (i.e., was still in calibration) is used with the updated calibration data for future processing.

The method continues at step 88 where the processing module 30 determines whether the recalibration parameter(s) are valid parameters. For example, the processing module 30 determines that the recalibration parameter(s) is/are valid when they converge to values that are within an expected range of parameter values. For instance, the recalibration parameter(s) are valid when they yield plausible results given the physical and/or electrical nature of the multiple camera system 20. As another example, the processing module determines that the recalibration parameter(s) is/are invalid as a result of a failure to generate recalibration parameters at step 86 (e.g., each of the potential solutions yields a negative depth for at least one triangulated point tuple), which may result from insufficient calibration data (e.g., too few pictures with sufficient textural diversity to provide adequate calibration data). As another example, the processing module determines that the recalibration parameter(s) is/are invalid if the mathematical optimization procedure has not converged after a specified number of iterations.

When the recalibration parameter(s) cannot be validated, the method repeats at step 80 to collect more calibration data. As an alternative or in addition to, the processing module 30 may use additional recalibration steps to generate adequate calibration data for creating valid recalibration parameters. For example, the processing module 30 may generate a message requesting that the user of the computing device takes one or more photographs of one or more images with textural diversity (e.g., significant changes in pixel data in one or more section of the photograph). As another example, the user may be requested at initial use of the computing device to take a picture of a reference object (e.g., him or herself, or other object with known dimensions) and then again to take a picture of the reference object when decalibration is detected. As yet another example, the multiple camera system may include an active camera that is capable of transmitting an infrared (IR) signal. The IR signal may be used to determine distance to an object or to project a pattern that assists in the calculation of the recalibration parameters.

When the recalibration parameter(s) is/are valid parameters, the method continues at step 90 where the processing module 30 updates the multiple camera system by storing the one or more recalibration parameters that were updated. For instance, the processing module stores the recalibration parameters as the updated calibration settings 77 in memory 60 of FIG. 7 and/or in the memory of the multiple camera system 20. Once the recalibration parameters are stored, the processing module 30 may delete the old calibration data 75 from the database 74 since it is now out of date. Note that calibration data that was not updated (i.e., was still in calibration) is maintained in the database 74 and used in conjunction with the updated calibration data for future image processing.

FIG. 16 is a logic diagram of an embodiment of a method for generating calibration data of step 82 of FIG. 6. This method begins at step 82-1 where the processing module 30 compares image data of a first camera of the multiple camera system with image data of a second camera (and other cameras when applicable) of the multiple camera system to identify a plurality of point tuples. For instance, the image (or picture) data of the first camera is for the same picture as the image (or picture) data of the second camera, but from a different perspective (this assuming time synchronization (e.g., 1 millisecond or less) between the cameras). The method identifies tuples of points, one per camera of the multi-camera system, which correspond to the same physical location in the scene. The processing module does this by associating points that have similar photometric properties. A point is a location in the image and may be a sub-pixel in size, a pixel in size, or multiple pixels in size and a point tuple includes a point from the first image data and a corresponding point from the second image data.

The processing module may use a known process to identify interest point tuples, an interest point detector (such as AKAKE, Harris corners, MSER, etc.) is applied to all images of the tuple, followed by computing a descriptor for each of these interest points (such as AKAKE, FREAK, BRIEF, ORB, etc.). The interest points are then matched between the images of the tuple using a distance metric on the descriptors (such as Euclidean distance for floating point descriptors, or Hamming distance for binary descriptors).

Some of the interest point tuples of the plurality of interest point tuples may not correspond to the same point (or region of points) but were associated because their estimated photosymmetric similarity was high. This may be due to, for example, poor texture or a repetitive pattern at the point location (e.g., a checkered shirt), high noise in the image, or simply because patches looked similar in descriptor space.

Figure 17:
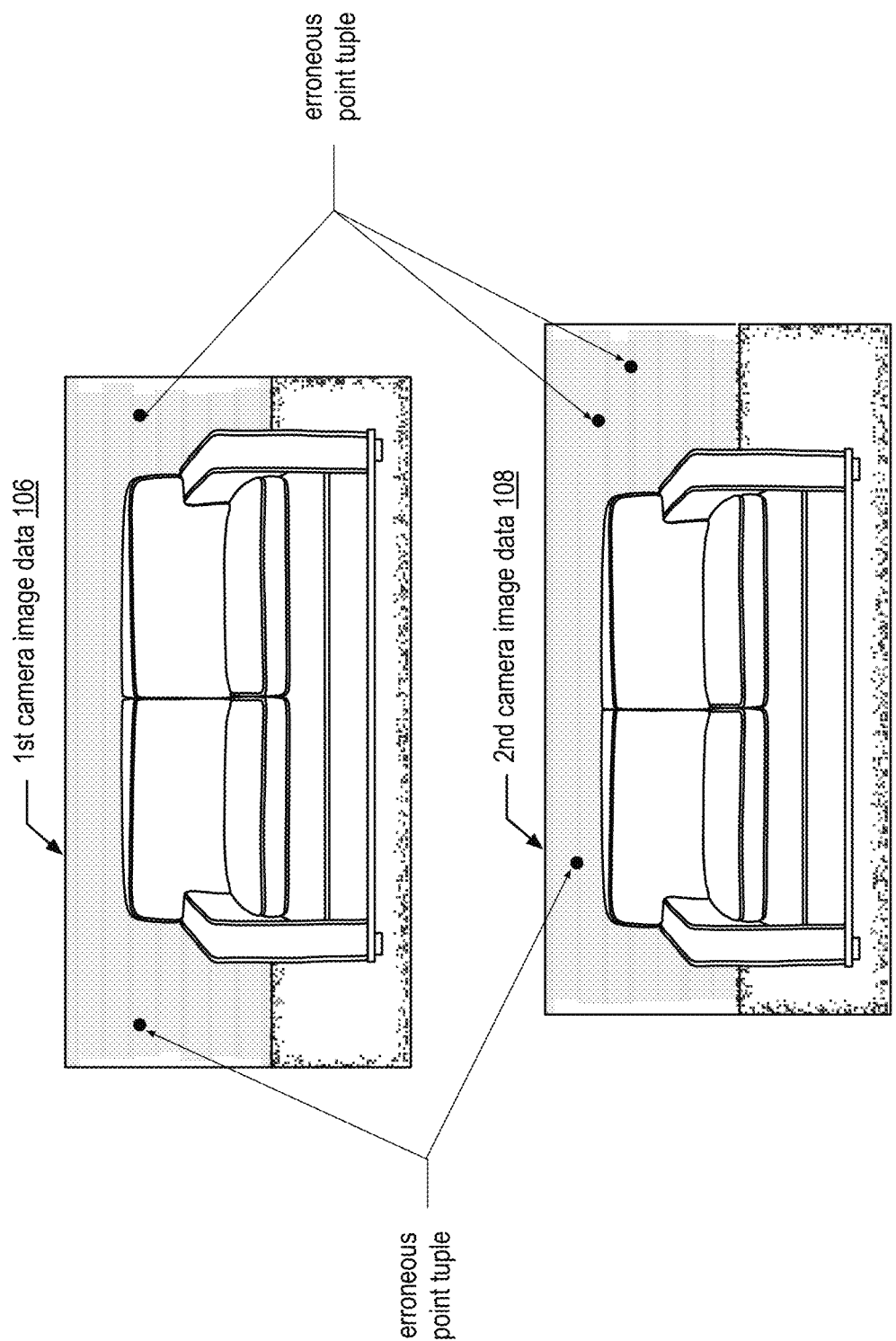
FIG. 17 is a diagram of an example of erroneous point tuples of the image data of the first camera and the second camera.

FIG. 17 is a diagram of an example of erroneous interest point tuples of the image data of the first camera and of the second camera. In this example, the pictures from the first and second cameras of the couch include the background wall and the floor. Assume that the wall is a solid color, the floor is carpeted, and the couch is a solid color leather couch. With these assumptions, when the first camera image data 106 is compared to the second camera image data 108 on a point-by-point basis, there will be a significant number of points with the same or nearly the same pixel data (e.g., substantially the same RGB, RGGB, or other form of pixel data).

Returning to the discussion of FIG. 16 and when included in the method, the identified erroneous interest point tuples are removed by the processing module 30 at step 82-2. The identifying and removal of erroneous interest point tuples may be done in a variety of ways. For example, since the matching process will yield a significant amount of erroneous interest point tuples, one or more constraints can be applied to detecting and removing erroneous interest point tuples. The constraints include:

Per multi-camera geometry, it is known that the scene point imaged at a given pixel in one camera falls on a line, the epipolar line, in the other camera. If the camera system was perfectly calibrated this line would be known. Since the camera system is assumed to be decalibrated, the line becomes an epipolar band. If the decalibration's upper bounds are known for all parameters, then the width of the band can be derived; otherwise a heuristically determined value, for example 30 pixels, may be used. The epipolar line/band can be reduced further to a line/band segment, the start and end point of which are provided by projecting into the image the three-dimensional point at infinity and the closest three-dimensional point that can still be imaged in focus (e.g., 500 mm), which may be referred to as closest and farthest point reasoning.

Each interest point must be matched to either exactly one or zero (in case of an occlusion) interest points in each other camera image. This constraint can be met by solving for the associations globally across the interest points. An optimal association algorithm such as the Hungarian solver, or with a faster, greedy method (for example: Pick the best match according to some metric; remove the corresponding interest points from the list; pick $2^{nd}$ best match; and so on . . . ) can be used to solve the associations globally across the interest points.

If a match's distance as per the distance metric is larger than a threshold (that is, the matches are not very similar in descriptor space), it may be rejected.

Robust estimators such as RANSAC can be used to fit a geometrical model, for example the essential matrix equation provided in equation (2) from Section 3, to the total collection of matches.

As yet another example, an essential matrix equation is applied to the plurality of interest point tuples to identify the erroneous interest point tuples. For instance, the essential matrix E takes the following form:

$$E=R[t]_x, \quad (1)$$

where $[t]_x$ is the matrix representation of the cross product with t. The following relation holds between the essential matrix and the interest point tuples:

$$(K_A^{-1})^T \cdot x_A^T \cdot E \cdot K_B^{-1} \cdot x_B = 0, \quad (2)$$

where $x_A$ and $x_B$ are a pair of interest points from an interest point tuple, and $K_A$ and $K_B$ are the intrinsic calibration matrices of cameras A and B. The set of estimated interest point tuples therefore defines an over-constrained set of linear equations, which can be used to solve for E. A robust estimator, such as RANSAC, can be used to solve for E. In the case of RANSAC, a maximal subsets of points is identified which agree on a same E matrix. The remainder of the interest points (i.e., those not agreeing with the solution for E) is outliers.

As example of identifying and removing erroneous interest point tuples, the processing module 30 executes a function that begins by finding interest points (IPs) in camera two with a visual saliency threshold greater than T. The function continues by fining IPs in camera 0 and camera 1 with a lower visual saliency threshold (e.g., T*0.2). For each interest point in camera 2, the function continues by (a) extracting a subset of interest points from camera 0, which are in accordance with the set of possible camera geometries (this includes using the epipolar line constraint, as well as closest and farthest point reasoning). (b) Extracting a number of interest points from camera 1, which are in accordance with the set of possible camera geometries. (c) For the interest points extracted from cameras 0 and 1, find the subset of possible pairs that is in accordance with possible camera 0 to camera 1 geometries. (d) From the identified subset of interest points (camera 0, camera 1) pairs, choose the triplet that maximizes photometric similarity according to a similarity measure. (e) Reject the triplet match identified in three-dimensions if (i) the triplet's photosimilarity is below a threshold, or (ii) if the second best triplet match has a similar photosimilarity value ("uniqueness constraint"). (f) The function continues with the processing module identifying the interest points from camera 0 or camera 1 that were assigned more than once after all triplets are computed. Those interest point tuples are either all removed, or only the interest point tuple with the highest photosimilarity value is kept. The function continues with the processing module performing an estimation of recalibration parameters to remove outlier interest point tuples. By applying a robust estimation technique, the remaining outliers are filtered out during that process.

As an optional additional step after removing the erroneous interest point tuples, the processing module refines the pixel positions of the identified interest point tuples. For example, the processing module may choose a subpixel location close to the interest point tuple location to maximize a photosimilarity measure.

The interest point tuples remaining after the robustness check are stored on the device at step 82-3, together with a key to the image they were extracted from. With each image taken, the database 74 of interest point tuples increases. The interest point tuple database is used to a) determine necessity for recalibration (step 84 of FIG. 16), and b) to estimate the re-calibration parameters (step 86 of FIG. 16). Finally, also the time $t_{recal}$ of the last recalibration event is ideally stored (initially, it equals the time of factory calibration).

Figure 18:
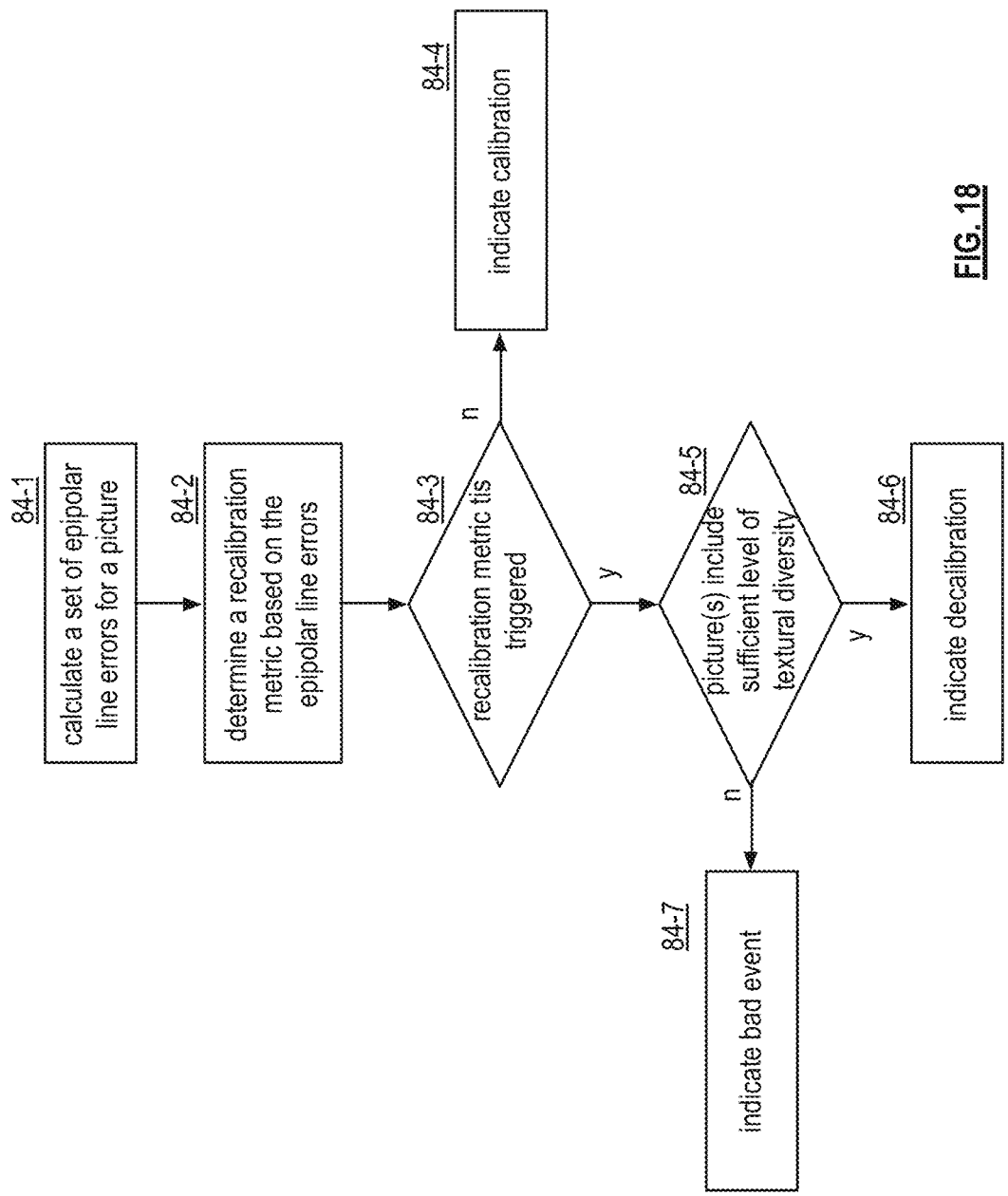
FIG. 18 is a logic diagram of an embodiment of a method for detecting occurrence of a recalibration event in accordance with the present invention.

FIG. 18 is a logic diagram of an embodiment of a method for detecting decalibration per step 84 of FIG. 15. The method begins at step 84-1 where a processing module 30 calculates a set of epipolar line errors for at least some matching point tuples of a set of matching interest point tuples of a picture. In general, for a given pair of interest points $x_A$ and $x_B$ from an interest point tuple, the epipolar line error is defined as the perpendicular distance from interest point $x_B$ to the epipolar line corresponding to interest point $x_A$. The absolute value of this error may optionally be used. The larger the distance, the more decalibrated the multi-camera system is (provided that the interest point tuple is a correct match). The epipolar line error can be generalized from two to n cameras by taking a function of the epipolar line error values from each of the views (e.g., the max, average, or median epipolar line error) among all n points in the tuple.

The method continues at step 84-2, where the processing module 30 determines a decalibration metric based on the set of epipolar line errors. There are a variety of ways to calculate the decalibration metric. For example, the median epipolar line error over all interest point tuples may be used; or, since the amount of decalibration may vary depending on the position in the field of view, the image can be partitioned into regions, a local median epipolar line error computed, and the region with the maximum such value returned.

As another example, a single image decalibration metric can be extended to multiple images to increase certainty of a decalibration event. For example, both the median epipolar error and the local median over regions can be computed over (a subset of) the last k images. Alternatively, either metric can be used as a threshold for a single image, and the final decalibration metric becomes the percentage of images among the last m images exhibiting an above-threshold value.

As yet another example, a recalibration metric may be triggered based on the device's sensor data. For instance, a decalibration event could be emitted when the device's accelerometer and/or gyroscope data show a plot characteristic of a fall; its thermometer data shows extreme temperatures; and/or its thermometer data shows a heat and cold cycle. A combination of the image-based method and exploitation of device odometry sensors is also possible.

The method continues at step 84-3 where the processing module 30 determines whether the decalibration metric is triggered (e.g., metric exceeds a decalibration threshold and/or as indicated by the device's sensory data). If not, the method continues at step 84-4 where the processing module 30 indicates a non-recalibration event (i.e., the multiple camera system is in calibration plus or minus a calibration tolerance). If, however, the decalibration metric is triggered, the method continues at step 84-5 where the processing module 30 determines whether one or more pictures includes a sufficient level of textural diversity to render a reliable indication of the recalibration event. In other words, the processing module 30 is determining whether the resulting decalibration metric for the one or more pictures is a reasonable value taking into account a bad image, a repetitive pattern, and/or other textural diversity of the picture.

For example, the processing module 30 uses a look-back range (k) of pictures for rendering its decision regarding a sufficient level of textural diversity. "k" may be established in a variety of ways. For example, "k" may be a fixed number (e.g., k=5). As another example, "k" may be a fixed number, the upper bound being the number of images taken since the time of the last re-calibration $t_{recal}$. As yet another example, "k" can be a fixed number, the upper bound being the number of images taken since the last "rough handling" event. A rough handling event is emitted when the device's accelerometer and gyro data show a plot characteristic of a fall, and/or its thermometer data shows extreme temperatures, and/or its thermometer data shows a heat and cold cycle. As a still further example, multiple values of "k" can be tested for: $\hat{k}$ can be increased with a fixed step size of n (n>=1). If a decalibration occurred, then the function of decalibration metric over $\hat{k}$, potentially after smoothing, will show a jump such that k can be chosen as that value of $\hat{k}$ at which the jump occurred.

Continuing with the example of using a look-back range, a subset of the look-back range k is chosen to include some or all of the images in the look-back range. Alternatively or in addition, the subset may be selected to reduce the influence of a "bad image" (due to imaging exclusively a repetitive pattern, or a textureless scene) by only including images that show reasonable values for the decalibration metric.

When the one or more pictures includes the sufficient level of textural diversity, the method continues at step 84-6 where the processing module indicates the recalibration event. If, however, the one or more pictures does not include the sufficient level of textural diversity (e.g., the decalibration metric is outside of a reasonable value), then the method continues at step 84-7, where the processing module 30 indicates a bad image event. This can be consumed by the user interface (UI). If there is repeated 'bad image' events and the user tries to use the depth functionality, the system may pop up a tutorial on how to take images that are suitable for recalibration.

FIG. 19 is a logic diagram of an embodiment of a method for generating recalibration parameters (e.g., one or more intrinsic parameters and/or one or more extrinsic parameters) per step 86 of FIG. 15. The method begins at step 86-1 where a processing module 30 determines a number of pictures to use for recalibration parameter calculations. This may be done in a variety of ways. For example, the number of pictures "k" is a fixed value (e.g., 5 pictures). As another example, the number pictures may set to be the number of pictures taken since the last recalibration. As yet another example, the number of pictures may be the number of pictures taken since the last "rough handling" event (e.g., the device's accelerometer and/or gyroscope data show a plot characteristic of a fall, its thermometer data shows extreme temperatures, and/or its thermometer data shows a heat and cold cycle). As a further example, the number of pictures "k" is a variable where k̂ is increased with a fixed step size of n (n>=1). If a decalibration occurred, then the function of decalibration metric over k̂, potentially after smoothing, will show a jump. A value for k is chosen as that value of k̂ at which the jump occurred. As a still further example, a combination of the above may be used to select a number of pictures. Note that the number of pictures used for recalibration may be the same number of pictures used to determine whether the pictures have a sufficient level of textural diversity.

The method continues at step 86-2 where the processing module calculates one or more extrinsic parameters and/or one or more intrinsic parameters for the multiple camera system. The extrinsic parameters relate to a camera's orientation and its position to the object coordinate frame. The camera's orientation may be mathematically expressed using a rotation matrix and the camera's position to the object coordinate frame may be mathematically expressed using a translation vector. The intrinsic parameters determine the projection from the camera coordinate frame onto image coordinates and include focal length, image principal point, and potentially distortion parameters. The calculation of one or more parameters may be done as shown in FIG. 20.

FIG. 20 is a logic diagram of an embodiment of a method for generating parameters per step 86-2 of FIG. 19. The method begins at step 86-3 where the processing module 30 produces an initial estimate for the camera's extrinsic parameters. For example, the rotational and translational parameters may be set to the values obtained during factory calibration. In another example, those parameters are set to the values outlined in the camera manufacturer's datasheet. In yet another example, the extrinsic parameters are roughly estimated using the images determined in step 86.1

One such way to estimate the extrinsic parameters is to estimate the essential matrix E using the previously extracted point tuples and then extract the rotational and translational parameters from it. The essential matrix E takes the following form:

$$E = R[t]_x, \quad (1)$$

where $[t]_x$ is the matrix representation of the cross product with t. The following relation holds between the essential matrix and matching point tuples:

$$x_A^T \cdot (K_A^{-1})^T \cdot E \cdot K_B^{-1} \cdot x_B = 0, \quad (2)$$

where $x_A$ and $x_B$ are a pair of points from a point tuple, and $K_A$ and $K_B$ are the intrinsic calibration matrices of cameras A and B, and defined, respectively as:

$$K = \begin{pmatrix} f_x & s & c_x \\ 0 & f_y & c_y \\ 0 & 0 & 1 \end{pmatrix}, \quad (2.1)$$

The $f_x$, $f_y$ denote the focal lengths and the $c_x$, $c_y$ is the principal point. The skew s is oftentimes set to 0. Some models assume that $f_x = f_y$.

The selected interest point tuples from all the selected images therefore define an over-constrained set of linear equations to solve for E. In general, equation (2) cannot be satisfied exactly for all pairs $(x_A^i, x_B^i)$. Instead, an algebraic distance is minimized. An example for an algebraic distance is $$D_{alg} = \sum_i \left\| x_A^{iT} \cdot (K_A^{-1})^T \cdot E \cdot K_B^{-1} \cdot x_B^i \right\|^2 \quad (3)$$

Linear least-square tools like a Singular Value Decomposition (SVD) can be used to find the minimum of $D_{alg}$.

Preferably E is solved for in a robust way, to further reduce the effect of outlier point correspondences. Robust estimation techniques like RANSAC can be used for this purpose. The method then extracts R and t from the essential matrix (E). In general, the processing module decomposes the estimated essential matrix into a set of solutions, wherein each solution of the set of solutions includes a rotation matrix (R) and a translation vector (t). For instance, when E is estimated, it can be decomposed into R and $t_{norm}$ (t can be solved upto an unknown scale factor in this manner), yielding four different solutions for [R, $t_{norm}$]. This ambiguity can be solved by triangulating the detected interest point tuples into three-dimensions, where only the correct [R, $t_{norm}$] will provide positive depth for all points.

The method then continues at step 86.4 where the processing module extracts initial values for the intrinsic camera parameters. As with the extrinsic parameters, this can be done, for example, by setting the intrinsic parameters to the values obtained from factory calibration. In another example the intrinsic parameters are set to the values outlined in the manufacturer's datasheet. In yet another example, the intrinsic parameters are roughly estimated using the images determined in step 86.1.

The method continues at step 86-5 in which the processing module 30 jointly refines the extrinsic and intrinsic parameters for all cameras. Steps 86-5-1 to 86-5-3 are an embodiment of this parameter refinement step. In step 86-5-1 an objective function is defined, which expresses the geometric consistency between the point tuples extracted from the images from step 86.1 and the current camera calibration. Typically a geometric distance is used. One example of a geometric distance is the point-epipolar line distance. In a two camera system consisting of two cameras A and B, it can take for example the following form:

$$D_{geom,A,B} = \sum_i d^2(x_B^j, Fx_A^j) + d^2(x_A^j, F^T x_B^j) \qquad (4)$$

with $F = K_A^{-T} \cdot E \cdot K_B^{-1}$, $E = R[t]_x$, and $K$ defined as in Eq. 2.1.

$d(x_B^i, Fx_A^i)$ denotes a distance metric between point $x_B^i$ and the epipolar line $Fx_A^i$. To decrease the chance of converging to sub-optimal or physically impossible estimates of the parameters, a regularization term can be added to the objective function, or constraints on the parameter space can be added. In a multi camera system, the geometric distances between the respective camera pairs can simply be added together to arrive at a joint geometric distance for all cameras:

$$D_{geom} = D_{geom,A,B} + \ldots + D_{geom,Y,Z}, \qquad (5)$$

Other ways to combine the pairwise geometric distances from Eq. 4 are possible.

The method then continues with step 86.5.2 in which the processing module 30 determines the parameter set to be optimized over. The subset can be chosen in a variety of ways: In one embodiment, all extrinsic and intrinsic parameters are always chosen for optimization (this comes at the cost of requiring more images to be taken by the user before a recalibration can take place). In another embodiment, it is determined from studying the mechanical design of the camera, which parts of the cameras can move. If for example it is found that only all the rotational parameters as well as the focal length of one camera can move, those parameters are selected, whereas the translational parameters, the principal point and the distortion parameters, and the focal lengths of the other cameras are discarded for optimization. In yet another embodiment the parameters, which have decalibrated are estimated based on the images identified in step 86.1. If the goal is to minimize the number of images the user is required to take before his device recalibrates, then the smallest possible set of recalibration parameters should be identified.

The method then continues with step 86.5.3 in which the processing module 30 optimizes the objective function defined in 86.5.1 using the parameters identified in 86.5.2. If there are no outliers present, a standard optimization scheme such as Levenberg-Marquardt is employed. In the more likely case where there are outliers, a robust optimizer must be used. An example for a robust estimator is RANSAC. (RANSAC requires a local optimization to be run per iteration; in this case again a standard optimization scheme such as Levenberg-Marquardt is employed per iteration.)

In another embodiment of the algorithm, priors of the camera system are used as additional constraints on the algorithm. As an example, a prior includes the probabilistic distribution of camera parameter values, which are learned offline. For instance, focal length f=900±12. As another example, a prior includes flags or probabilities indicating which cameras are uncalibrated. The flags or probabilities may be estimated during the calibration/rectification verification phase. With the use of priors, it allows the processing module to calibrate all of the intrinsic parameters and/or all of the extrinsic parameters when needed.

This embodiment of an algorithm allows the multi-camera calibration problem to be framed using a Bayesian formulation. In an approach, called Bayesian recalibration, a maximum a posteriori (MAP) estimate of calibration parameters $\hat{\theta}$ is computed as the maximum of the posterior probability $p(\theta|z)$ defined below:

$$p(\theta|z) \sim \int p(z|\theta) p(\theta) d\theta$$

Where z are visual observations (image point matches), $p(z|\theta)$ is the likelihood of observing z given calibration parameters $\theta$ and $p(\theta)$ is a prior on calibration parameters. In this approach, we define $p(\theta)$ as a Gaussian distribution. This distribution corresponds to the range spanned by camera parameters and can be learned from a sensor study for instance.

In the 2-camera case, for instance, camera parameters are defined as $\theta=(K_A, K_B, R, t)$. The likelihood $p(z|\theta)$ is defined from image point matches as:

$$p(z|\theta) = \frac{1}{\rho} \exp\left(-\frac{1}{\sigma^2} D_{geom}\right)$$

Where $\rho$ is a normalization constant, $\sigma$ a factor corresponding to the image noise variance and $D_{geom}$ the geometric distance defined in equation (4).

Note that re-calibration should take effect when the parameter re-estimation a) has converged and b) to values that are within the expected range for all parameters. If these conditions are met (as checked in step 88 in FIG. 15), the updated parameters are stored on a storage medium and used by the multi-camera system to infer three-dimensional structure for all images going forward. In this case also the time of the recalibration event is stored, and all interest point tuples present in the database can optionally be removed.

As may be used herein, the terms "substantially" and "approximately" provides an industry-accepted tolerance for its corresponding term and/or relativity between items. Such an industry-accepted tolerance ranges, depending on the industry, from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for a computing device to continually recalibrate a multiple camera system, the method comprises:
for each new picture captured by each camera of the multiple camera system, wherein the multiple camera system includes two or more cameras, and wherein each camera of the two or more cameras is physically separated by a distance from another camera of the two or more cameras:
  generating new image data;
  generating new calibration data based on the new image data, wherein the new calibration data includes a new set of matching interest point tuples from each camera, and wherein generating the new set of matching interest point tuples includes:
    analyzing the new image data from each camera to identify a plurality of interest point tuples;
    removing erroneous interest point tuples from the plurality of interest point tuples based on coordinate system mapping inconsistencies of the multiple camera system to produce the new set of matching interest point tuples;
  updating existing calibration data regarding the multiple camera system to include the new calibration data to produce updated calibration data; and
  detecting for decalibration based on the updated calibration data; and when the decalibration is detected:
    generating recalibration parameters based on one or more of the existing calibration data and the updated calibration data;
    determining whether the recalibration parameters are valid parameters;
    when the recalibration parameters are valid parameters, updating the multiple camera system based on the recalibration parameters; and
    when the recalibration parameters are not valid parameters:
      generating additional calibration data to determine the recalibration parameters by one or more of: generating one or more additional pictures having sufficient textural diversity; and generating infrared (IR) signal image data, wherein one or more cameras of the multiple camera system is operable to transmit the IR signal.

2. The method of claim 1, wherein the removing erroneous interest point tuples comprises at least one of:
  identifying an erroneous interest point tuple of the erroneous interest point tuples when a first interest point of the erroneous interest point tuple of a first camera of the two of more cameras is outside of an epipolar band of a second interest point of the erroneous interest point tuple of a second camera of the two of more cameras;
  identifying the erroneous interest point tuple when the first interest point matches more than one interest point of the second camera;
  identifying the erroneous interest point tuple when a distance metric between the first interest point and the second interest point is greater than a distance threshold; and
  utilizing an essential matrix equation on the plurality of interest point tuples to identify the erroneous interest point tuples.

3. The method of claim 1, wherein the detecting the decalibration comprises:
  detecting occurrence of one or more physical events from a set of physical events occurring to the device, wherein the set of physical event includes dropping, rapid acceleration, rapid deceleration, flexing, a temperature increase, a temperature decrease, a use milestone, and an aging milestone.

4. The method of claim 1, wherein the detecting decalibration comprises:
  calculating a set of epipolar liner errors for at least some matching interest point tuples of the new set of matching interest point tuples;
  determining a decalibration metric based on the set of epipolar line errors;
  when the decalibration metric exceeds a decalibration threshold:
    determining whether the new picture includes a sufficient level of textural diversity to render a reliable indication of the recalibration event; and
    when the new picture includes the sufficient level of textural diversity, indicating the decalibration.

5. The method of claim 4 further comprises:
  when the new picture does not include the sufficient level of textural diversity:
    capturing an additional picture;
    calculating an additional set of epipolar line errors for at least some matching interest point tuples of an additional set of matching interest point tuples of the additional picture;
    determining an additional decalibration metric based on the additional set of epipolar line errors;
    when the additional decalibration metric exceeds a decalibration threshold:
      determining whether the picture and the additional picture collectively include the sufficient level of textural diversity to render the reliable indication of the recalibration event; and
      when the picture and the additional picture collectively include the sufficient level of textural diversity, indicating the decalibration.

6. The method of claim 1, wherein the generating the recalibration parameters based on the one or more of the existing calibration data and the updated calibration data comprises:
  using the existing calibration data for recalibration parameter calculations; and
  calculating extrinsic parameters for the multiple camera system using an estimated essential matrix and the updated calibration data.

7. The method of claim 6, wherein the calculating the extrinsic parameters comprises:
  generating the estimated essential matrix based on a set of linear equations, wherein a linear equation of the set of linear equations includes a first coordinate point of a first camera of the two or more cameras, a second coordinate point of a second camera of the two or more cameras, a first matrix of the first camera, a second matrix of the second camera, and a first essential matrix of a first interest point tuple of a set of matching interest point tuples, wherein the first interest point tuple includes the first and second coordinates points;
  decomposing the estimated essential matrix into a set of solutions, wherein each solution of the set of solutions includes a rotation matrix and a translation vector;
  for each solution of the set of solutions, triangulating interest point tuples of the calibration data into a three-dimensional coordinate system to produce triangulated points;
  identifying the solution of the set of solution that provides valid results for the triangulated interest points to produce an identified solution; and
  establishing the extrinsic parameters as the rotation matrix and translation vector of the identified solution.

8. The method of claim 6, wherein the calculating the extrinsic parameters comprises:

generating the estimated essential matrix based on a set of linear equations, wherein a linear equation of the set of linear equations includes a fundamental matrix, a first matrix of the first camera, a second matrix of the second camera, and a first essential matrix of a first point tuple of the set of matching interest point tuples, wherein an interest point tuple includes the point and the corresponding point;

decomposing the estimated essential matrix into a set of solutions, wherein each solution of the set of solutions includes a rotation matrix and a translation vector;

for each solution of the set of solutions, triangulating interest point tuples of the calibration data into a three-dimensional coordinate system to produce triangulated interest points;

identifying the solution of the set of solution that provides valid results for the triangulated interest points to produce an identified solution; and establishing the extrinsic parameters as the rotation matrix and translation vector of the identified solution.

9. The method of claim 6 further comprises:
obtaining camera parameter constraints regarding the two or more cameras; and
calculating intrinsic parameters and extrinsic parameters for each camera of the two or more cameras using a Bayesian formulation, the camera parameter constraints, and the calibration data.

10. The method of claim 1, wherein the determining whether the recalibration parameters are valid parameters comprises:
determining that the recalibration parameters converge to values that are within an expected range of parameter values.

11. The method of claim 1 further comprises:
when the decalibration is detected, providing a message for display on the computing device, wherein the message indicates decalibration of the multiple camera system.

12. A computing device comprises:
a multiple camera system that includes two or more cameras, wherein each camera of the two or more cameras is physically separated by a distance from another camera of the two or more cameras;
memory; and
a processing module operably coupled to the two or more cameras and the memory, wherein the processing module is operable to continually recalibrate the multiple camera system by:
for each new picture captured by each camera of the multiple camera system:
generate new image data;
store the new image data in the memory;
generate new calibration data based on the new image data, wherein the new calibration data includes a new set of matching interest point tuples from each camera, and wherein generating the new set of matching interest point tuples includes:
analyzing the new image data from each camera to identify a plurality of interest point tuples;
removing erroneous interest point tuples from the plurality of interest point tuples based on coordinate system mapping inconsistencies of the multiple camera system to produce the new set of matching interest point tuples;
updating existing calibration data regarding the multiple camera system to include the new calibration data to produce updated calibration data; and
store the updated calibration data in the memory;
detect for decalibration based on the updated calibration data; and
when the decalibration is detected:
generate recalibration parameters based on one or more of the existing calibration data and the updated calibration data;
determine whether the recalibration parameters are valid parameters;
when the recalibration parameters are valid parameters, update the multiple camera system based on the recalibration parameters; and
when the recalibration parameters are not valid parameters:
generate additional calibration data to determine the recalibration parameters by one or more of: generating one or more additional pictures having sufficient textural diversity; and utilizing infrared (IR) signal image data, wherein one or more cameras of the multiple camera system is operable to transmit the IR signal.

13. The computing device of claim 12, wherein the processing module is further operable to remove the erroneous interest point tuples by at least one of:
identifying an erroneous interest point tuple of the erroneous interest point tuples when a first interest point of the erroneous interest point tuple of a first camera of the two of more cameras is outside of an epipolar band of a second interest point of the erroneous interest point tuple of a second camera of the two of more cameras;
identifying the erroneous interest point tuple when the first interest point matches more than one interest point of the second camera;
identifying the erroneous interest point tuple when a distance metric between the first interest point and the second point of interest is greater than a distance threshold; and
utilizing an essential matrix equation on the plurality of interest point tuples to identify the erroneous interest point tuples.

14. The computing device of claim 12, wherein the processing module is further operable to detect the decalibration by:
detecting occurrence of one or more physical events from a set of physical events occurring to the device, wherein the set of physical event includes dropping, rapid acceleration, rapid deceleration, flexing, a temperature increase, a temperature decrease, a use milestone, and an aging milestone.

15. The computing device of claim 12, wherein the processing module is further operable to detect the decalibration by:
calculating a set of epipolar line errors for at least some matching interest point tuples of the new set of matching interest point tuples;
determining a decalibration metric based on the set of epipolar line errors;
when the decalibration metric exceeds a decalibration threshold:
determining whether the new picture includes a sufficient level of textural diversity to render a reliable indication of the recalibration event; and when the new picture includes the sufficient level of textural diversity, indicating the decalibration.

16. The computing device of claim 15, wherein the processing module is further operable to:
when the new picture does not include the sufficient level of textural diversity:
capture an additional picture;
calculate an additional set of epipolar liner errors for at least some matching interest point tuples of an additional set of matching interest point tuples of the additional picture;
determine an additional decalibration metric based on the additional set of epipolar line errors;
when the additional decalibration metric exceeds a decalibration threshold:
determine whether the new picture and the additional picture collectively include the sufficient level of textural diversity to render the reliable indication of the recalibration event; and
when the new picture and the additional picture collectively include the sufficient level of textural diversity, indicate the decalibration.

17. The computing device of claim 12, wherein the processing module is further operable to generate the recalibration parameters based on the one or more of the existing calibration data and the updated calibration data by:
using the existing calibration data for recalibration parameter calculations; and
calculating extrinsic parameters for each camera of the two or more cameras using an estimated essential matrix and the updated calibration data.

18. The computing device of claim 17, wherein the processing module is further operable to calculate the extrinsic parameters by:
generating the estimated essential matrix based on a set of linear equations, wherein a linear equation of the set of linear equations includes a first coordinate point of a first camera of the two or more cameras, a second coordinate point of a second camera of the two or more cameras, a first matrix of the first camera, a second matrix of the second camera, and a first essential matrix of a first interest point tuple of a set of matching interest point tuples, wherein the first interest point tuple includes the first and second coordinates points;
decomposing the estimated essential matrix into a set of solutions, wherein each solution of the set of solutions includes a rotation matrix and a translation vector;
for each solution of the set of solutions, triangulating interest point tuples of the calibration data into a three-dimensional coordinate system to produce triangulated interest points;
identifying the solution of the set of solution that provides valid results for the triangulated interest points to produce an identified solution; and
establishing the extrinsic parameters as the rotation matrix and translation vector of the identified solution.

19. The computing device of claim 17, wherein the processing module is further operable to calculate the extrinsic parameters by:
generating the estimated essential matrix based on a set of linear equations, wherein a linear equation of the set of linear equations includes a fundamental matrix, a first matrix of the first camera, a second matrix of the second camera, and a first essential matrix of a first interest point tuple of the set of matching interest point tuples, wherein an interest point tuple includes the interest point and the corresponding interest point;
decomposing the estimated essential matrix into a set of solutions, wherein each solution of the set of solutions includes a rotation matrix and a translation vector;
for each solution of the set of solutions, triangulating interest point tuples of the calibration data into a three-dimensional coordinate system to produce triangulated interest points;
identifying the solution of the set of solution that provides valid results for the triangulated interest points to produce an identified solution; and
establishing the extrinsic parameters as the rotation matrix and translation vector of the identified solution.

20. The computing device of claim 17, wherein the processing module is further operable to:
obtain camera parameter constraints regarding the two or more cameras; and
calculate intrinsic parameters and extrinsic parameters for each camera of the two or more cameras using a Bayesian formulation, the camera parameter constraints, and the calibration data.

21. The computing device of claim 12, wherein the processing module is further operable to determine whether the recalibration parameters are valid parameters by:
determining that the recalibration parameters converge to values that are within an expected range of parameter values.

22. A computer readable storage device comprises:
for each new picture captured by each camera of a multiple camera system wherein the multiple camera system includes two or more cameras:
a first memory section that stores operational instructions that, when executed by a computing device, causes the computing device to:
generate new image data; and
store the new image data in memory of the computing device;
generate new calibration data based on the new image data, wherein the calibration data includes a new set of matching interest point tuples from each camera, and wherein generating the set of matching interest point tuples includes:
analyzing the new image data from each camera to identify a plurality of interest point tuples;
removing erroneous interest point tuples from the plurality of interest point tuples based on coordinate system mapping inconsistencies of the multiple camera system to produce the new set of matching interest point tuples;
update existing calibration data regarding the multiple camera system to include the new calibration data to produce updated calibration data; and
store the updated calibration data in the memory of the computing device; and
a second memory section that stores operational instructions that, when executed by the computing device, causes the computing device to:
detect for decalibration based on the updated calibration data; and
a third memory section that stores operational instructions that, when executed by the computing device, causes the computing device to:
when the decalibration is detected:
generate recalibration parameters based on one or more of the existing calibration data and the updated calibration data;
determine whether the recalibration parameters are valid parameters;

when the recalibration parameters are valid parameters, update the multiple camera system based on the recalibration parameters; and
when the recalibration parameters are not valid parameters:
generate additional calibration data to determine the recalibration parameters by one or more of: generating one or more additional pictures having sufficient textural diversity; and utilizing infrared (IR) signal image data, wherein one or more cameras of the multiple camera system is operable to transmit the IR signal.

23. The computer readable storage device of claim 22, wherein the first memory section further stores operational instructions that, when executed by the computing device, causes the computing device to remove the erroneous interest point tuples by at least one of:
identifying an erroneous interest point tuple of the erroneous interest point tuples when a first interest point of the erroneous interest point tuple of a first camera of the two of more cameras is outside of an epipolar band of a second interest point of the erroneous interest point tuple of a second camera of the two of more cameras;
identifying the erroneous interest point tuple when the first interest point matches more than one interest point of the second camera;
identifying the erroneous interest point tuple when a distance metric between the first interest point and the second interest point is greater than a distance threshold; and
utilizing an essential matrix equation on the plurality of interest point tuples to identify the erroneous interest point tuples.

24. The computer readable storage device of claim 22, wherein the second memory section further stores operational instructions that, when executed by the computing device, causes the computing device to detect the decalibration by:
detecting occurrence of one or more physical events from a set of physical events occurring to the device, wherein the set of physical event includes dropping, rapid acceleration, rapid deceleration, flexing, a temperature increase, a temperature decrease, a use milestone, and an aging milestone.

25. The computer readable storage device of claim 22, wherein the second memory section further stores operational instructions that, when executed by the computing device, causes the computing device to detect the decalibration by:
calculating a set of epipolar liner errors for at least some matching interest points of the new set of matching interest point tuples;
determining a decalibration metric based on the set of epipolar line errors;
when the decalibration metric exceeds a decalibration threshold:
determining whether the new picture includes a sufficient level of textural diversity to render a reliable indication of the recalibration event; and
when the new picture includes the sufficient level of textural diversity, indicating the decalibration.

26. The computer readable storage device of claim 25, wherein the first memory section further stores operational instructions that, when executed by the computing device, causes the computing device to:
when the new picture does not include the sufficient level of textural diversity:
capture an additional picture;
calculate an additional set of epipolar liner errors for at least some matching interest points of an additional set of matching interest point tuples of the additional picture;
determine an additional decalibration metric based on the additional set of epipolar line errors;
when the additional decalibration metric exceeds a decalibration threshold:
determine whether the new picture and the additional picture collectively include the sufficient level of textural diversity to render the reliable indication of the recalibration event; and
when the picture and the additional picture collectively include the sufficient level of textural diversity, indicate the decalibration.

27. The computer readable storage device of claim 22, wherein the third memory section further stores operational instructions that, when executed by the computing device, causes the computing device to generate the recalibration parameters based on the one or more of the existing calibration data and the updated calibration data by:
using the existing calibration data for recalibration parameter calculations; and
calculating extrinsic parameters for each camera of the two or more cameras using an estimated essential matrix and the updated calibration data.

28. The computer readable storage device of claim 27, wherein the third memory section further stores operational instructions that, when executed by the computing device, causes the computing device to calculate the extrinsic parameters by:
generating the estimated essential matrix based on a set of linear equations, wherein a linear equation of the set of linear equations includes a first coordinate point of a first camera of the two or more cameras, a second coordinate point of a second camera of the two or more cameras, a first matrix of the first camera, a second matrix of the second camera, and a first essential matrix of a first interest point tuple of a set of matching interest point tuples, wherein the first interest point tuple includes the first and second coordinates points;
decomposing the estimated essential matrix into a set of solutions, wherein each solution of the set of solutions includes a rotation matrix and a translation vector;
for each solution of the set of solutions, triangulating interest point tuples of the calibration data into a three-dimensional coordinate system to produce triangulated interest points;
identifying the solution of the set of solution that provides valid results for the triangulated interest points to produce an identified solution; and
establishing the extrinsic parameters as the rotation matrix and translation vector of the identified solution.

29. The computer readable storage device of claim 27, wherein the third memory section further stores operational instructions that, when executed by the computing device, causes the computing device to calculate the extrinsic parameters by:
generating the estimated essential matrix based on a set of linear equations, wherein a linear equation of the set of linear equations includes a fundamental matrix, a first matrix of the first camera, a second matrix of the second camera, and a first essential matrix of a first interest point tuple of the set of matching interest point tuples, wherein an interest point tuple includes the interest point and the corresponding interest point;

decomposing the estimated essential matrix into a set of solutions, wherein each solution of the set of solutions includes a rotation matrix and a translation vector;

for each solution of the set of solutions, triangulating interest point tuples of the calibration data into a three-dimensional coordinate system to produce triangulated interest points;

identifying the solution of the set of solution that provides valid results for the triangulated interest points to produce an identified solution; and establishing the extrinsic parameters as the rotation matrix and translation vector of the identified solution.

30. The computer readable storage device of claim 27, wherein the third memory section further stores operational instructions that, when executed by the computing device, causes the computing device to:

obtain camera parameter constraints regarding the two or more cameras; and calculate intrinsic parameters and extrinsic parameters for each camera of the two or more cameras using a Bayesian formulation, the camera parameter constraints, and the calibration data.

31. The computer readable storage device of claim 22, wherein the third memory section further stores operational instructions that, when executed by the computing device, causes the computing device to determine whether the recalibration parameters are valid parameters by:

determining that the recalibration parameters converge to values that are within an expected range of parameter values.

32. The computer readable storage device of claim 22, wherein the third memory section further stores operational instructions that, when executed by the computing device, causes the computing device to:

when the decalibration is detected, display a message that indicates decalibration of the multiple camera system.

* * * * *